US 8,254,945 B2

(12) United States Patent
Lee et al.

(10) Patent No.: US 8,254,945 B2
(45) Date of Patent: Aug. 28, 2012

(54) APPARATUS AND METHOD FOR ALLOCATING DOWNLINK BURST IN BROADBAND WIRELESS COMMUNICATION SYSTEM

(75) Inventors: Hee-Kwang Lee, Anyang-si (KR); Seung-Joo Maeng, Seongnam-si (KR); Jae-Ho Jeon, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 708 days.

(21) Appl. No.: 12/380,230

(22) Filed: Feb. 25, 2009

(65) Prior Publication Data

US 2009/0213807 A1 Aug. 27, 2009

(30) Foreign Application Priority Data

Feb. 26, 2008 (KR) ........................ 10-2008-0017333

(51) Int. Cl.
*H04W 72/00* (2009.01)
*H04J 11/00* (2006.01)
(52) U.S. Cl. ........ 455/450; 370/208; 370/329; 370/344; 370/232
(58) Field of Classification Search .................. None
See application file for complete search history.

(56) References Cited

U.S. PATENT DOCUMENTS

| 7,835,281 B2* | 11/2010 | Lee et al. ........................ 370/232 |
| 7,912,005 B2* | 3/2011 | Lee et al. ........................ 370/329 |
| 7,961,696 B2* | 6/2011 | Ma et al. ........................ 370/344 |
| 2008/0034107 A1* | 2/2008 | Lee et al. ........................ 709/232 |
| 2008/0039107 A1* | 2/2008 | Ma et al. ........................ 455/450 |

FOREIGN PATENT DOCUMENTS

| KR | 1020060067850 A | 6/2006 |
| KR | 1020060082056 A | 7/2006 |

* cited by examiner

*Primary Examiner* — Jinsong Hu
*Assistant Examiner* — William Nealon

(57) ABSTRACT

A method of allocating bursts in a broadband wireless communication system is provided. The method includes dividing a downlink period into a plurality of regions according to a burst property, calculating a residual symbol axis size and a residual subchannel axis size of a first region conforming to two-dimensional allocation among the plurality of regions, allocating bursts to be allocated to the first region in a descending order, wherein the bursts are respectively allocated in a rectangular shape having a length corresponding to the number of residual symbols along a time axis or in a rectangular shape having a length corresponding to the number of residual subchannels along a frequency axis, and allocating bursts to be allocated to at least one region conforming to one-dimensional allocation among the plurality of regions to the at least one region conforming to one-dimensional allocation according to a scheduling priority.

30 Claims, 12 Drawing Sheets

APPARATUS AND METHOD FOR ALLOCATING DOWNLINK BURST IN BROADBAND WIRELESS COMMUNICATION SYSTEM

CROSS-REFERENCE TO RELATED APPLICATION(S) AND CLAIM OF PRIORITY

The present application claims the benefit under 35 U.S.C. §119(a) of a Korean patent application filed in the Korean Intellectual Property Office on Feb. 26, 2008 and assigned Serial No. 10-2008-0017333, the entire disclosure of which is hereby incorporated by reference.

TECHNICAL FIELD OF THE INVENTION

The present invention relates to a broadband wireless communication system. More particularly, the present invention relates to an apparatus and method for allocating a downlink burst in a broadband wireless communication system.

BACKGROUND OF THE INVENTION

In the next generation communication system, also known as the $4^{th}$ Generation (4G) communication system, research is actively in progress to provide a Quality of Service (QoS) with a data transfer rate of about 100 Mbps. In particular, the 4G communication system is currently being developed to ensure mobility and QoS in a Broadband Wireless Access (BWA) communication system, such as a Wireless Local Area Network (WLAN) system and a Wireless Metropolitan Area Network (WMAN) system. A representative example of such a communication system is an Institute of Electrical and Electronics Engineers (IEEE) 802.16 system. The IEEE 802.16 system employs an Orthogonal Frequency Division Multiplexing (OFDM)/Orthogonal Frequency Division Multiple Access (OFDMA) scheme so that a broadband network can be supported in a physical channel.

In the broadband wireless communication system such as the IEEE 802.16 system, data is transmitted in a frame unit, and one frame is divided into a downlink period for transmitting data from a Base Station (BS) to a Mobile Station (MS) and an uplink period for transmitting data from the MS to the BS. The downlink period and the uplink period are divided along a frequency axis and a time axis. A slot is a unit of a two-dimensional array divided along the frequency axis and the time axis. A subcarrier is one of resources shared in the broadband wireless communication system such as the IEEE 802.16 system. The subcarrier is channelized, and a concatenation of at least one subcarrier is used as a unit called a subchannel. A physical concatenation of data transmitted and received through a plurality of slots is called a burst. The BS can increase a resource usage efficiency by performing power boosting or power deboosting on a transmitted burst.

The BS that allocates radio resources has to effectively distribute subchannels and slots to a plurality of MSs, and also has to increase a radio resource usage efficiency by performing power boosting or power deboosting. Further, in a situation where a non-Multiple Input Multiple Output (non-MIMO) MS and a MIMO MS co-exist, the BS has to allocate the radio resources by properly distinguishing a non-MIMO burst and a MIMO burst. However, a resource allocation method considering all cases of the co-existence of the non-MIMO burst and the MIMO burst, the use of the power boosting, and the use of the power deboosting has not been proposed yet.

SUMMARY OF THE INVENTION

To address the above-discussed deficiencies of the prior art, it is a primary aspect of the present invention to solve at least the above-mentioned problems and/or disadvantages and to provide at least the advantages described below. Accordingly, an aspect of the present invention is to provide an apparatus and method for allocating bursts by considering all cases of the co-existence of non-Multiple Input Multiple Output (MIMO) burst and a MIMO burst, the use of power boosting, and the use of power deboosting in a broadband wireless communication system.

Another aspect of the present invention is to provide an apparatus and method for minimizing waste of resources by considering a data burst size and the number of slots to be null padded in a broadband wireless communication system.

Another aspect of the present invention is to provide an apparatus and method for maximizing an efficiency of utilizing overall system resources by effectively allocating bursts so that waste of slots is minimized in a burst allocation region of a downlink frame while ensuring a Quality of Service (QoS) when a nonMIMO& nonhybrid Automatic Repeat reQuest (nonHARQ) burst, a nonMIMO&HARQ burst, a MIMO&nonHARQ burst, and a MIMO&HARQ burst co-exist in a broadband wireless communication system.

Another aspect of the present invention is to provide an apparatus and method for maximizing an efficiency of utilizing overall system resources by effectively allocating bursts so that the number of wasted slots is minimized by considering the number of null padding slots and a burst size in a burst allocation region of a downlink frame in a broadband wireless communication system.

Another aspect of the present invention is to provide an apparatus and method for minimizing a MAP overhead by concatenating bursts constituting Protocol Data Units (PDUs) to be transmitted to the same mobile station (MS) and PDUs having the same Modulation and Coding Scheme (MCS) level into one burst in a broadband wireless communication system.

Another aspect of the present invention is to provide an apparatus and method for increasing a throughput by considering power boosting and power deboosting when bursts are allocated to a downlink frame and for increasing a cell coverage or a cell capacity in a broadband wireless communication system.

Another aspect of the present invention is to provide an apparatus and method for decreasing an implementation complexity in comparison with a conventional method by considering power boosting and power deboosting when bursts are allocated to a downlink frame in a broadband wireless communication system.

In accordance with an aspect of the present invention, a method of allocating bursts in a broadband wireless communication system is provided. The method includes dividing a downlink period into a plurality of regions according to a burst property, calculating a residual symbol axis size and a residual subchannel axis size of a first region conforming to two-dimensional allocation among the plurality of regions, allocating bursts to be allocated to the first region in a descending order, wherein the bursts are respectively allocated in a rectangular shape having a length corresponding to the number of residual symbols in a time axis or in a rectangular shape having a length corresponding to the number of residual subchannels in a frequency axis, and allocating bursts to be allocated to at least one region conforming to one-dimensional allocation among the plurality of regions to the at least one region conforming to one-dimensional allocation according to a scheduling priority.

In accordance with another aspect of the present invention, a base station (BS) apparatus in a broadband wireless communication system is provided. The apparatus includes a manager for dividing a downlink period into a plurality of regions according to a burst property and for calculating a residual symbol axis size and a residual subchannel axis size of a first region conforming to two-dimensional allocation among the plurality of regions, and an allocator for allocating bursts to be allocated to the first region in a descending order, wherein the bursts are respectively allocated in a rectangular shape having a length corresponding to the number of residual symbols in a time axis or in a rectangular shape having a length corresponding to the number of residual subchannels in a frequency axis, and for allocating bursts to be allocated to at least one region conforming to one-dimensional allocation among the plurality of regions to the at least one region conforming to one-dimensional allocation according to a scheduling priority.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 1 through 8B, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system.

Hereinafter, a burst allocation technique considering all cases of the co-existence of a non-Multiple Input Multiple Output (MIMO) burst and a MIMO burst, the use of power boosting, and the use of power deboosting in a broadband wireless communication system will be described. Although a wireless communication system employing an Orthogonal Frequency Division Multiplexing (OFDM)/Orthogonal Frequency Division Multiple Access (OFDMA) scheme will be described below as an example, the present invention can also equally apply to other types of wireless communication systems.

Figure 1:
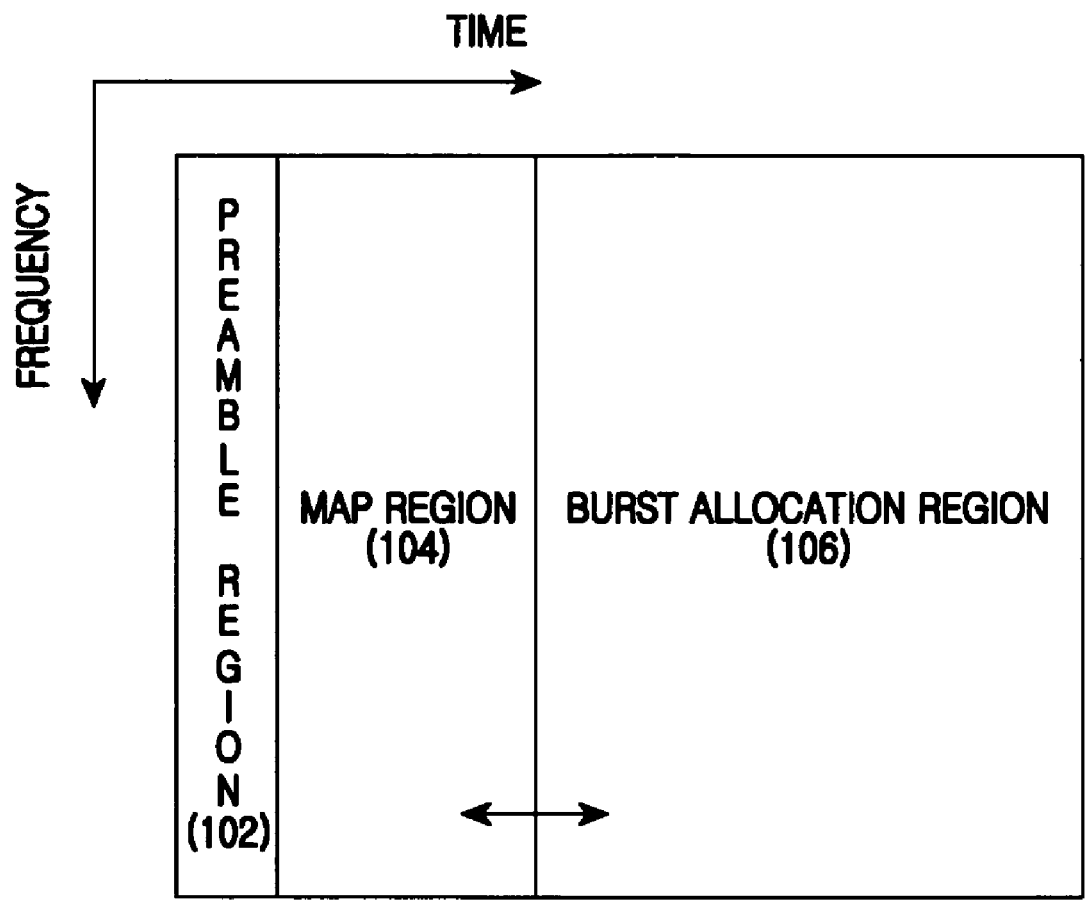
FIG. 1 illustrates an example of a downlink frame structure in a broadband wireless communication system according to an exemplary embodiment of the present invention.

FIG. 1 illustrates an example of a downlink frame structure in a broadband wireless communication system according to an exemplary embodiment of the present invention.

Referring to FIG. 1, the downlink frame includes a preamble region 102, a MAP region 104, and a burst allocation region 106 in a time axis. The preamble region 102 is used to transmit a preamble signal for acquiring frame synchronization. The MAP region 104 is used to transmit a downlink MAP or an uplink MAP which must be received by all mobile stations (MSs). That is, the downlink MAP includes burst allocation information of the downlink frame, and the uplink MAP includes burst allocation information of an uplink frame. The burst allocation region 106 is used to transmit downlink data bursts to the MSs. Allocation information of the bursts included in the burst allocation region 106 is delivered through the downlink MAP. In the burst allocation region 106, a horizontal axis is the time axis which is divided into OFDM symbols, and a vertical axis is a frequency axis which is divided into subchannels. A time-axis size (i.e., symbol-axis size) of the MAP region 104 and a time-axis size of the burst allocation region 106 are variable in an arrow direction shown in FIG. 1. That is, the greater the time-axis size of the MAP region 104, the smaller the time-axis size of the burst allocation region 106.

Figure 2A:
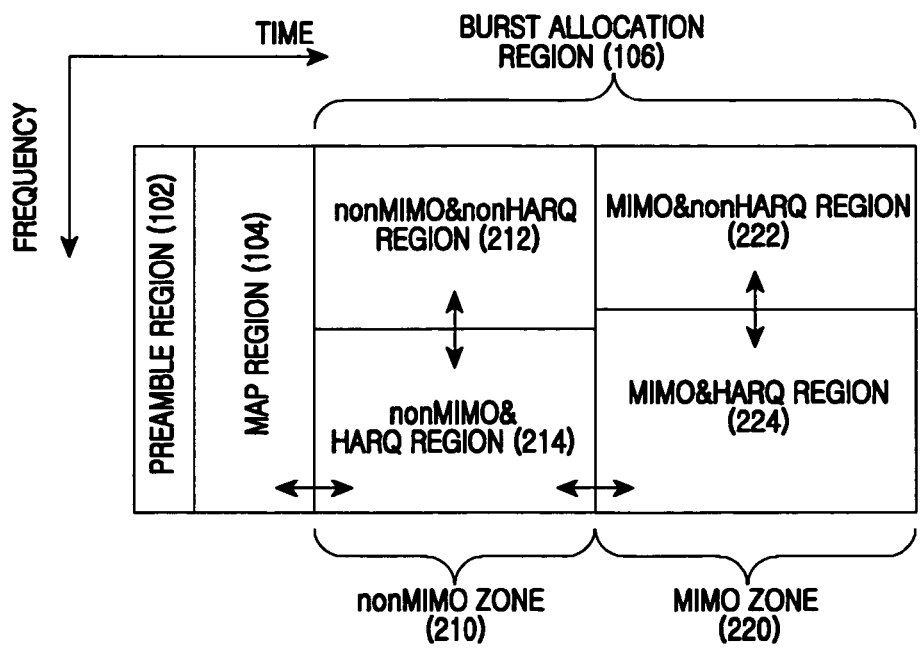
FIGS. 2A and 2B illustrate examples of using a burst allocation region of a downlink frame in a broadband wireless communication system according to an exemplary embodiment of the present invention.
Figure 2B:
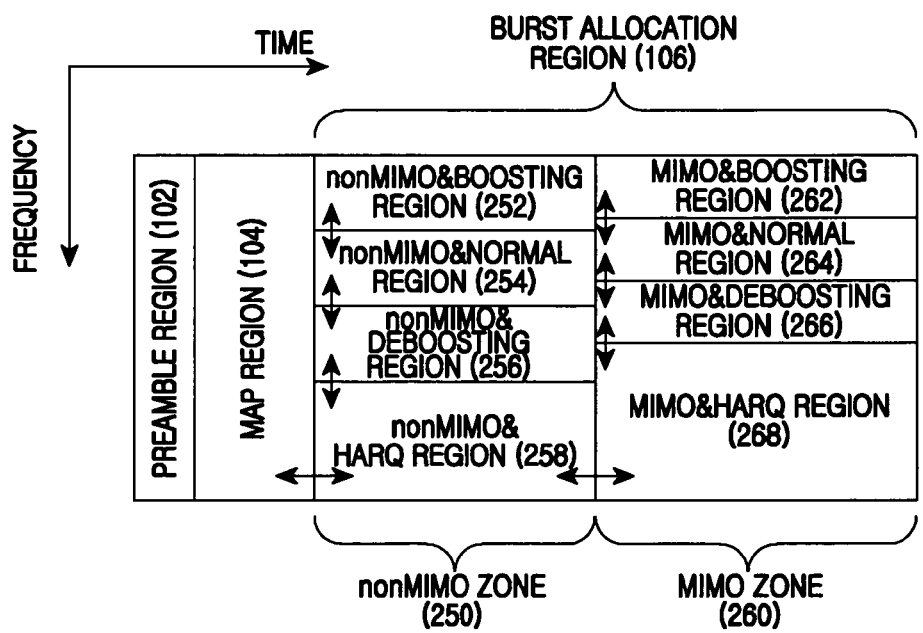

FIGS. 2A and 2B illustrate examples of using the burst allocation region 106 of the downlink frame of FIG. 1 in a broadband wireless communication system according to an exemplary embodiment of the present invention.

Referring to FIG. 2A, the burst allocation region 106 is divided along the time axis into two regions, i.e., a nonMIMO zone 210 and a MIMO zone 220. The nonMIMO zone 210 is used to transmit bursts conforming to a Single Input Single Output (SISO) scheme or a Single Input Multiple Output (SIMO) scheme. The MIMO zone 220 is used to transmit bursts conforming to a MIMO scheme. The nonMIMO zone 210 is divided along the frequency axis into two sub-regions, i.e., a nonMIMO&nonHybrid Automatic Repeat reQuest (nonHARQ) region 212 and a nonMIMO&HARQ region 214. The MIMO zone 220 is divided along the frequency axis into two sub-regions, i.e., a MIMO&nonHARQ region 222 and a MIMO&HARQ region 224. Burst allocation in the nonMIMO&nonHARQ region 212 conforms to a two-dimensional allocation scheme. Burst allocation in other regions conforms to a one-dimensional allocation scheme.

Time-axis sizes (i.e., the number of symbols) of the MAP region 104 and the burst allocation region 106 are variable in an arrow direction shown in FIG. 2A. Likewise, time-axis sizes of the nonMIMO zone 210 and the MIMO zone 220 in the burst allocation region 106 are also variable. In addition, frequency-axis sizes (i.e., the number subchannels) of the nonMIMO&nonHARQ region 212, the nonMIMO&HARQ region 214, the MIMO&nonHARQ region 222, and the MIMO&HARQ region 224 are variable.

In the MIMO zone 220 shown in FIG. 2A, a MIMO&nonHARQ burst allocated to the MIMO&nonHARQ region 222 is the same as a MIMO&HARQ burst allocated to the MIMO&HARQ region 224 except that retransmission does not conform to an HARQ scheme. Therefore, in FIG. 2A, the MIMO&nonHARQ region 222 and the MIMO&HARQ region 224 can be configured into a single region.

Referring to FIG. 2B, the burst allocation region 106 is divided along the time axis into two regions, i.e., a nonMIMO zone 250 and a MIMO zone 260. The nonMIMO zone 250 is divided along the frequency axis into four sub-regions, i.e., a nonMIMO&boosting region 252, a nonMIMO&normal region 254, a nonMIMO&deboosting region 256, and a nonMIMO&HARQ region 258. The MIMO zone 260 is divided along the frequency axis into four sub-regions, i.e., a MIMO&boosting region 262, a MIMO&normal region 264, a MIMO&deboosting region 266, and a MIMO&HARQ region 268. Herein, nonMIMO includes SISO and SIMO. Burst allocation in the nonMIMO&boosting region 252, the nonMIMO&normal region 254, and the nonMIMO&deboosting region 256 conforms to a two-dimensional allocation scheme. Burst allocation in other regions conforms to a one-dimensional allocation scheme. Boosting of '3 dB' is applied to bursts transmitted through the nonMIMO&boosting region 252. Deboosting of '−3 dB' is applied to bursts transmitted through the nonMIMO&deboosting region 256. The magnitude of boosting and deboosting may differ according to detailed embodiments of the present invention.

Time-axis sizes (i.e., the number of symbols) of the MAP region 104 and the burst allocation region 106 are variable in an arrow direction shown in FIG. 2B. Likewise, time-axis sizes of the nonMIMO zone 250 and the MIMO zone 260 in the MAP region 104 are also variable. In addition, frequency-axis sizes (i.e., the number of subchannels) of the nonMIMO&boosting region 252, the nonMIMO&normal region 254, and the nonMIMO&deboosting region 256, the nonMIMO&HARQ region 258, the MIMO&boosting region 262, the MIMO&normal region 264, the MIMO&deboosting region 266, and the MIMO&HARQ region 268 are variable.

In the MIMO zone 260 shown in FIG. 2B, a MIMO&boosting burst, a MIMO&normal burst, and a MIMO&deboosting burst to be allocated to the MIMO&boosting region 262, the MIMO&normal region 264, and the MIMO&deboosting region 266 are the same as a MIMO&HARQ burst to be allocated to the MIMO&HARQ region 268 except that retransmission does not conform to the HARQ scheme. Therefore, in FIG. 2B, the MIMO&boosting region 262, the MIMO&normal region 264, the MIMO&deboosting region 266, and the MIMO&HARQ region 268 can be configured into a single region.

Comparing FIGS. 2A and 2B, the burst allocation region 106 of FIG. 2B is an exemplary case of using boosting or deboosting in the nonMIMO&nonHARQ region 212 and the MIMO&nonHARQ region 222. The boosting or deboosting can also be applied to the nonMIMO&HARQ region 258 and the MIMO&HARQ region 268. However, due to a relatively low gain, boosting or deboosting is not performed on bursts conforming to the HARQ scheme in the present invention.

Figure 3:
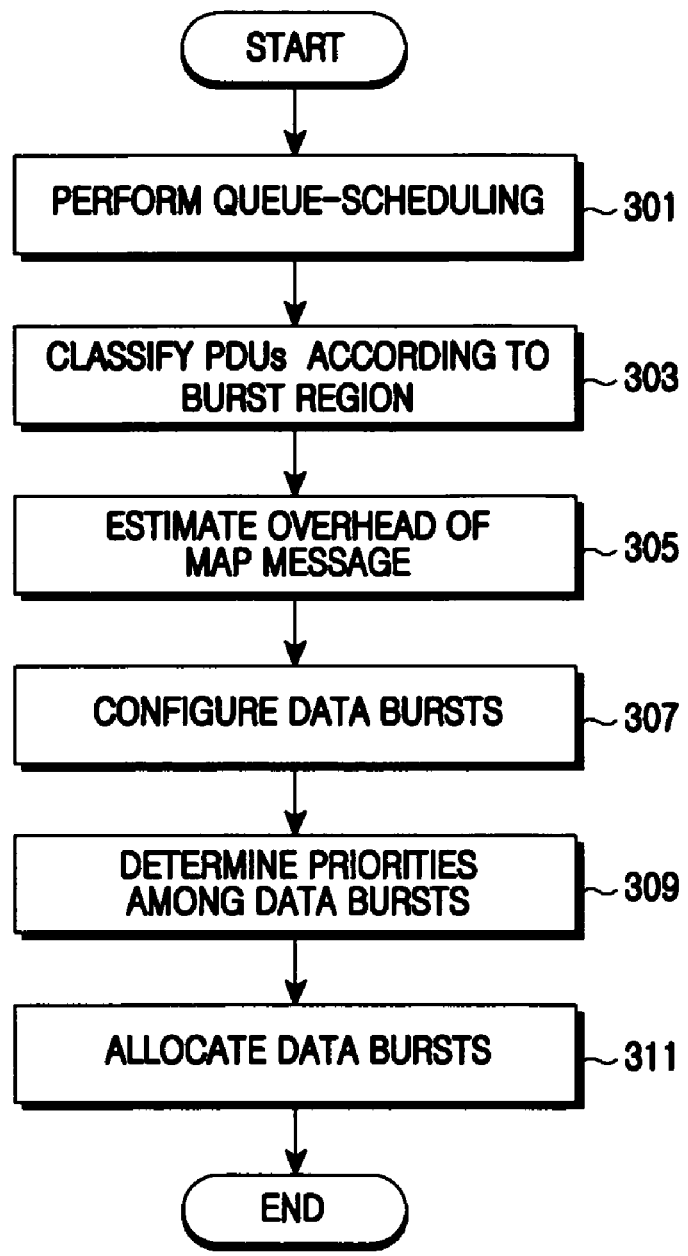
FIG. 3 is a flowchart illustrating a burst allocation process of a base station (BS) in a broadband wireless communication system according to an exemplary embodiment of the present invention.

FIG. 3 is a flowchart illustrating a burst allocation process of a base station (BS) in a broadband wireless communication system according to an exemplary embodiment of the present invention.

Referring to FIG. 3, the BS performs queue-scheduling to determine transmission priorities among Protocol Data Units (PDUs) in step 301. The priorities are preferentially determined according to service classes, and thereafter are determined according to a connection corresponding to each PDU in each service class. The PDU is a basic unit for dividing data in a physical layer.

After performing the queue-scheduling, the BS classifies the PDUs according to a burst region in step 303. That is, the BS classifies each PDU according to the burst region in which the PDU is allocated.

In step 305, the BS estimates an overhead of a MAP message for indicating burst allocation information. That is, to know a resource amount of the available burst allocation region 106, the BS estimates a resource amount occupied by the MAP message in the downlink frame.

After estimating the overhead of the MAP message, the BS configures data bursts in step 307. In other words, the BS concatenates the data bursts so that PDUs to be transmitted to the same MS and PDUs applied with the same Modulation and Coding Scheme (MCS) level can be concatenated into one burst. The MCS level is a value that indicates one of combinations of a classified data modulation scheme and a channel coding scheme. The PDUs to be transmitted to the same MS have the same Basic-Connection IDentifier (B-CID). For example, in the case of a nonMIMO&nonHARQ burst, the PDUs having the same MCS level are configured into one burst. In the case of a nonMIMO&HARQ burst, a MIMO&nonHARQ burst, and a MIMO&HARQ burst, the PDUs to be transmitted to the same MS (i.e., the PDUs having the same B-CID) are configured into one burst.

After configuring the data bursts, the BS determines priorities among the data bursts in step 309. The priorities are independently determined in each sub-region divided by burst property. That is, the BS determines a priority of each data burst by using a priority of a PDU having a lowest priority among the PDUs included in each data burst. In other words, the priority of each data burst depends on the priority of the PDU having the lowest priority among the PDUs included in each data burst.

Thereafter, proceeding to step 311, the BS allocates the data bursts on the basis of the transmission priorities according to the queue-scheduling result. Step 311 will be described below in detail with reference to FIGS. 4A to 5D.

For convenience of explanation, shortened words will be used hereinafter, as shown in Table 1 below.

TABLE 1

| shortened word | description |
| --- | --- |
| N | the total number of slots to be allocated to all regions |
| N{<region>} | the total number of slots to be allocated to <region> |
| No{total} | a maximum number of slots allocatable to all regions included in a downlink subframe recognized by estimating a MAP message size |

TABLE 1-continued

| shortened word | description |
| --- | --- |
| No{<region>} | a maximum number of slots allocatable to <region> included in a downlink subframe recognized by estimating a MAP message size |
| Fo{<region>} | a minimum size of subchannel required to allocate N(<region>) |
| Effective Power Fo{<region>} | a minimum size of subchannel required to allocate N(<region>) based on power |
| So{nonMIMO + MIMO} | the number of data symbols |
| So{nonMIMO} | the number of data symbols of a nonMIMO zone |
| So{MIMO} | the number of data symbols of a MIMO zone |
| Ro{<region>} | a maximum number of available null padding slots predicted in <region> |
| Fu{<region>} | a size of subchannel axis included in <region> |
| Su{<region>} | a size of symbol axis included in <region> |
| Ru{<region>} | the number of null padding slots accumulated in <region> |

Figure 4A:
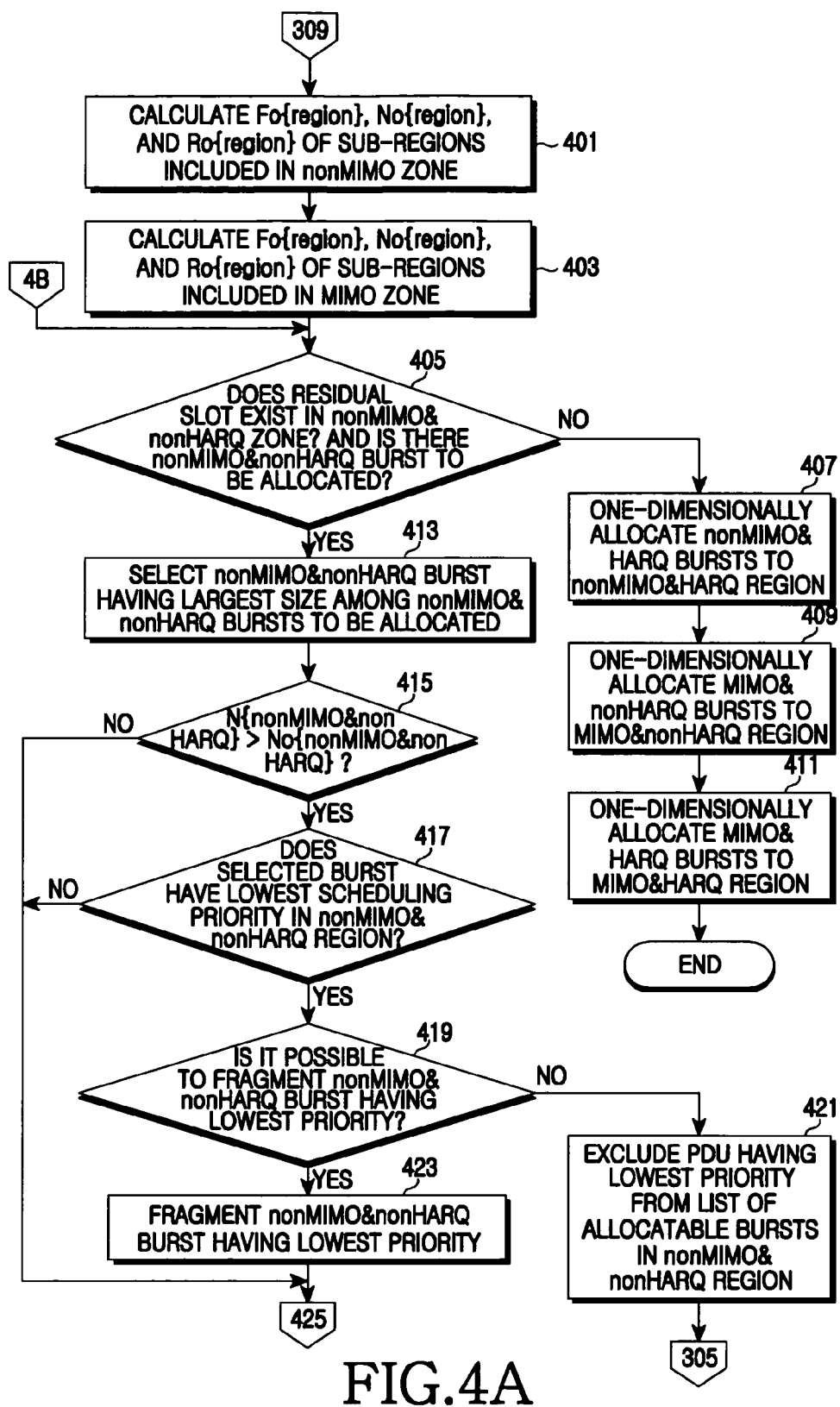
FIGS. 4A and 4B illustrate a process of allocating data bursts by a BS in a broadband wireless communication system according to a first embodiment of the present invention.
Figure 4B:
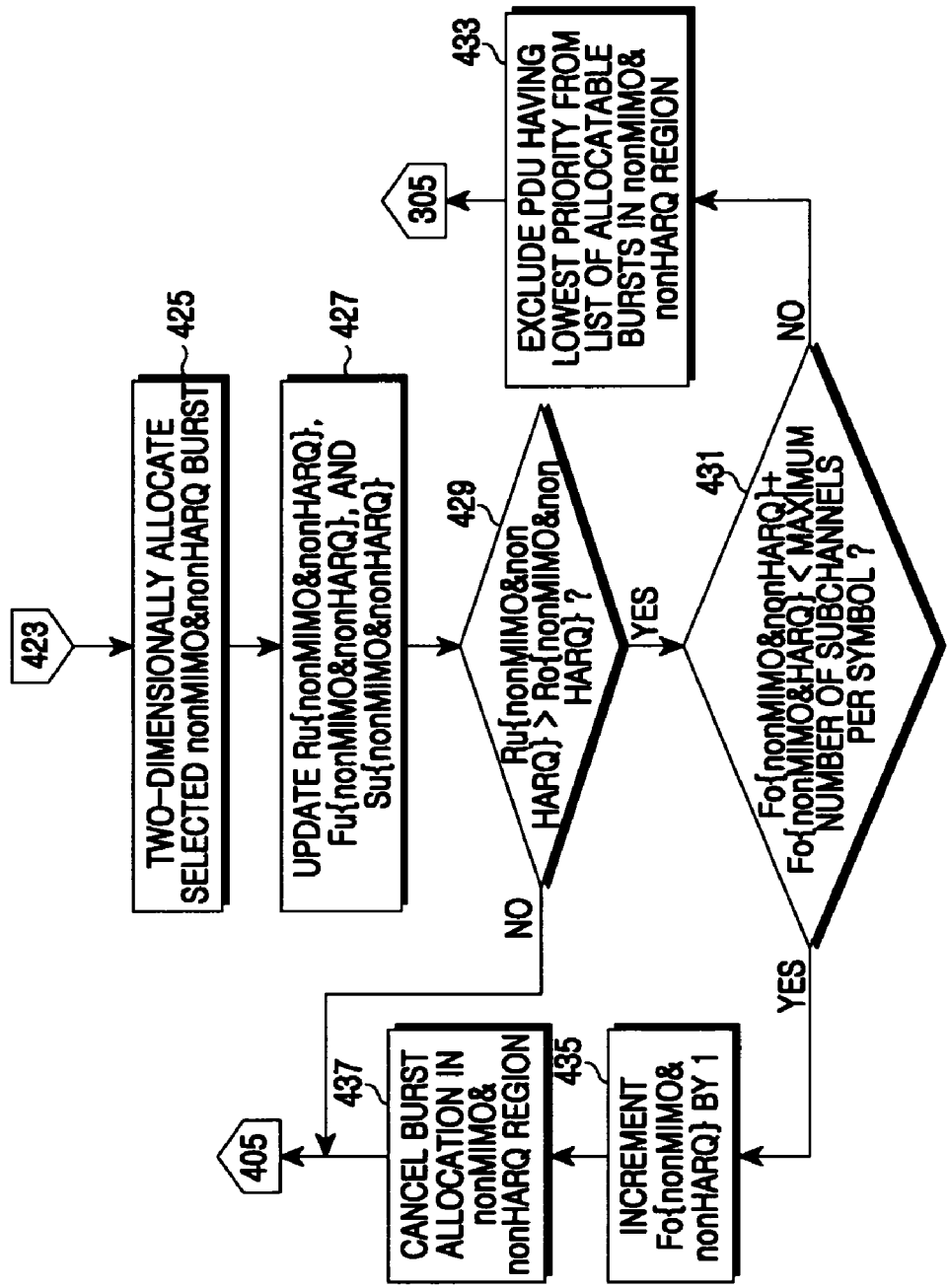

FIGS. 4A and 4B illustrate a process of allocating data bursts by a BS in a broadband wireless communication system according to a first embodiment of the present invention. In FIGS. 4A and 4B, bursts are allocated as shown in the burst allocation region 106 of the downlink frame of FIG. 2A.

Referring to FIG. 4A, the BS calculates Fo{region}, No{region}, and Ro{region} of the sub-regions included in the nonMIMO zone 210 in step 401. In other words, the BS calculates the Fo{region}, No{region}, and Ro{region} for each of the nonMIMO&nonHARQ region 212 and the nonMIMO&HARQ region 214. The Fo{region}, No{region}, and Ro{region} of the sub-regions included in the nonMIMO zone 210 are calculated according to Equation 1 below:

$$Fo\{region\}=ceil(N\{region\}/So\{nonMIMO\})$$

$$No\{region\}=Fo\{region\}\times So\{nonMIMO\}$$

$$Ro\{region\}=Fo\{region\}\times So\{nonMIMO\}-N\{region\}. \quad \text{[Eqn. 1]}$$

In Equation 1 above, ceil( ) denotes a ceiling operator.

If a sum of subchannel-axis sizes of the nonMIMO zone 210 is greater than a maximum number of subchannels per symbol, the Fo{region} of one sub-region including a data burst with a lowest priority between the two sub-regions included in the nonMIMO zone 210 is determined relative to the other sub-region. For example, if the sum of subchannel-axis sizes of the nonMIMO zone 210 (that is, a sum of Fo{nonMIMO&nonHARQ} and Fo{nonMIMO&HARQ}) is greater than the maximum number of subchannels per symbol and if the nonMIMO&HARQ region 214 includes the data burst with the lowest priority in the nonMIMO zone 210, the BS determines the Fo{nonMIMO&HARQ} by subtracting the Fo{nonMIMO&nonHARQ} from the maximum number of subchannels per symbol. In this case, Fu{region} is initialized to Fo{region}, and Su{region} is initialized to So{nonMIMO}.

In step 403, the BS calculates Fo{region}, No{region}, and Ro{region} of the sub-regions included in the MIMO zone 220. In other words, the BS calculates the Fo{region}, No{region}, Ro{region} for each of the MIMO&nonHARQ region 222 and the MIMO&HARQ region 224. The Fo{region}, No{region}, and Ro{region} of the sub-regions included in the MIMO zone 220 are calculated according to Equation 2 below:

$$Fo\{region\}=ceil(N\{region\}/So\{MIMO\})$$

$$No\{region\}=Fo\{region\}\times So\{MIMO\}$$

$$Ro\{region\}=Fo\{region\}\times So\{MIMO\}-N\{region\}. \quad \text{[Eqn. 2]}$$

In Equation 2 above, ceil( ) denotes a ceiling operator.

If a sum of subchannel-axis sizes of the nonMIMO zone 220 is greater than a maximum number of subchannels per symbol, Fo{region} of one sub-region including a data burst with a lowest priority between the two sub-regions included in the nonMIMO zone 220 is determined relative to the other sub-region. For example, if the sum of subchannel-axis sizes of the MIMO zone 220 (that is, a sum of Fo{MIMO&nonHARQ} and Fo{MIMO&HARQ}) is greater than the maximum number of subchannels per symbol and if the MIMO&HARQ region 224 includes the data burst with the lowest priority in the MIMO zone 220, the BS determines the Fo{MIMO&HARQ} by subtracting the Fo{MIMO&nonHARQ} from the maximum number of subchannels per symbol. In this case, Fu{region} is initialized to Fo{region}, and Su{region} is initialized to So{MIMO}.

Figure 7A:
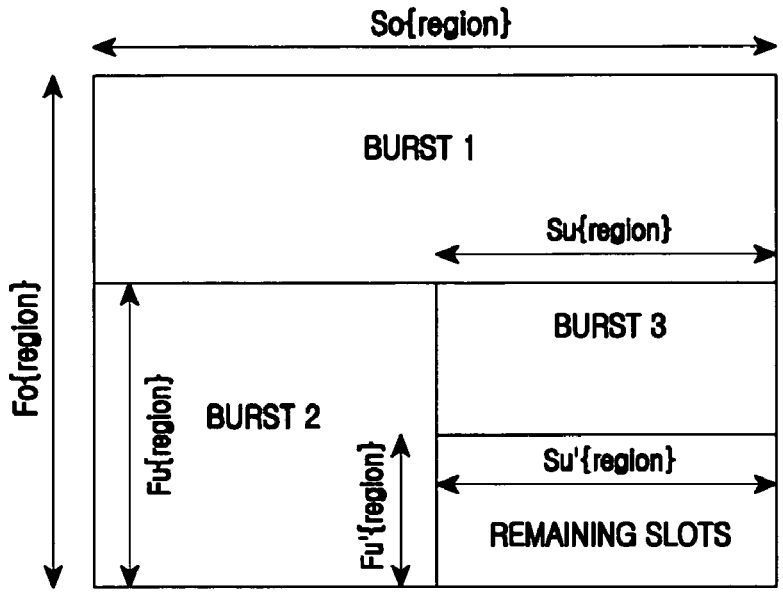
FIGS. 7A and 7B illustrate examples of two-dimensional allocation and one-dimensional allocation in a broadband wireless communication system according to an exemplary embodiment of the present invention.
Figure 7B:
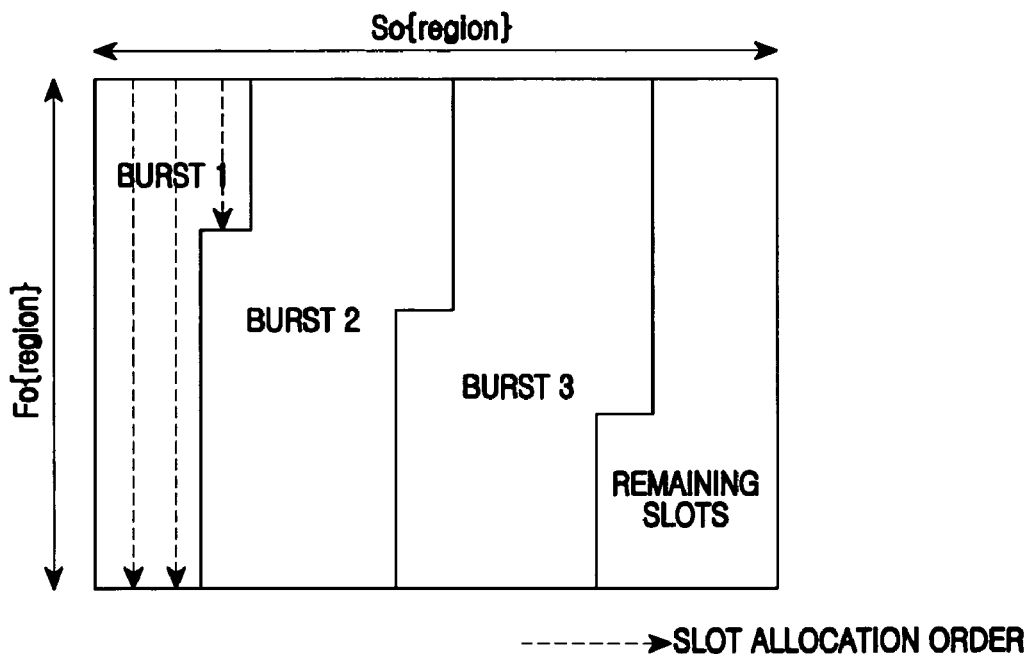

In steps 405 to 437, the BS two-dimensionally allocates nonMIMO&nonHARQ bursts concatenated by an MCS level in a descending order of burst size, and thereafter one-dimensionally allocates nonMIMO&HARQ bursts, MIMO&nonHARQ bursts, and MIMO&HARQ bursts concatenated by a receiving MS according to a scheduling priority of each region. The two-dimensional allocation implies burst allocation as shown in FIG. 7A. The one-dimensional allocation implies burst allocation as shown in FIG. 7B.

After calculating the Fo{region}, No{region}, and Ro{region} of each region, proceeding to step 405, the BS determines whether a residual slot exists in the nonMIMO&nonHARQ region 212 and also determines whether there exists a nonMIMO&nonHARQ burst to be allocated.

If there is no residual slot in the nonMIMO&nonHARQ region 212 or if there is no nonMIMO&nonHARQ burst to be allocated, proceeding to step 407, the BS allocates nonMIMO&HARQ bursts to the nonMIMO&HARQ region 214 according to the scheduling priority. That is, the BS allocates the nonMIMO&HARQ bursts by using a start point and an allocation length. In allocating the nonMIMO&HARQ bursts, the BS preferentially allocates an HARQ retransmission burst and thereafter allocates an HARQ initial transmission burst.

In step 409, the BS allocates the MIMO&nonHARQ bursts to the MIMO&nonHARQ region 222 according to the scheduling priority. That is, the BS allocates the MIMO&nonHARQ bursts by using a start point and an allocation length.

In step 411, the BS allocates the MIMO&HARQ bursts to the MIMO&HARQ region 224 according to the scheduling priority, and thereafter the procedure of FIG. 4A ends. That is, the BS allocates the MIMO&HARQ bursts by using a start point and an allocation length. In allocating the MIMO&HARQ bursts, the BS preferentially allocates an HARQ retransmission burst and thereafter allocates an HARQ initial transmission burst.

On the other hand, if the residual slot exists in the nonMIMO&nonHARQ region 212 and also if there is the nonMIMO&nonHARQ burst to be allocated in step 405, the BS selects a nonMIMO&nonHARQ burst having a largest size in step 413. That is, the BS selects the nonMIMO&nonHARQ burst to be allocated.

In step 415, the BS compares N{nonMIMO&nonHARQ} with No{nonMIMO&nonHARQ}. In other words, the BS compares a total number of slots to be allocated to the nonMIMO&nonHARQ region 212 with a total number of slots that can be allocated to the nonMIMO&nonHARQ region 212 and that is recognized in a process of estimating a MAP message size. If the N{nonMIMO&nonHARQ} is less than or equal to the No{nonMIMO&nonHARQ}, the procedure proceeds to step 425.

Otherwise, if the No{nonMIMO&nonHARQ} is greater than the No{nonMIMO&nonHARQ}, proceeding to step 417, the BS determines whether a scheduling priority of the nonMIMO&nonHARQ burst selected in step 413 is lowest in the nonMIMO&nonHARQ region 212. If the scheduling priority of the selected nonMIMO&nonHARQ burst is not lowest, the procedure proceeds to step 425.

If the scheduling priority of the selected nonMIMO&nonHARQ burst is lowest, proceeding to step 419, the BS determines whether the selected nonMIMO&nonHARQ burst can be fragmented. Whether fragmentation can be performed or not is determined according to a burst property. For example, a B-CID or an HARQ retransmission burst cannot be fragmented.

If the selected nonMIMO&nonHARQ burst cannot be fragmented, proceeding to step 421, the BS excludes a PDU having a lowest scheduling priority in the nonMIMO&nonHARQ region 212 from a list of allocatable bursts. In this case, the BS adds a PDU having a scheduling priority subsequent to that of the excluded PDU to the list of allocatable bursts. Thereafter, returning to step 305 of FIG. 3, the BS re-estimates the MAP message size.

If the nonMIMO&nonHARQ burst having the lowest priority can be fragmented in step 419, proceeding to step 423, the BS fragments the nonMIMO&nonHARQ burst having the lowest priority. In this case, the nonMIMO&nonHARQ burst having the lowest priority is fragmented into a size corresponding to the remaining slots other than slots to be occupied by other nonMIMO&nonHARQ bursts having a higher priority than the nonMIMO&nonHARQ burst having the lowest priority.

Figure 8A:
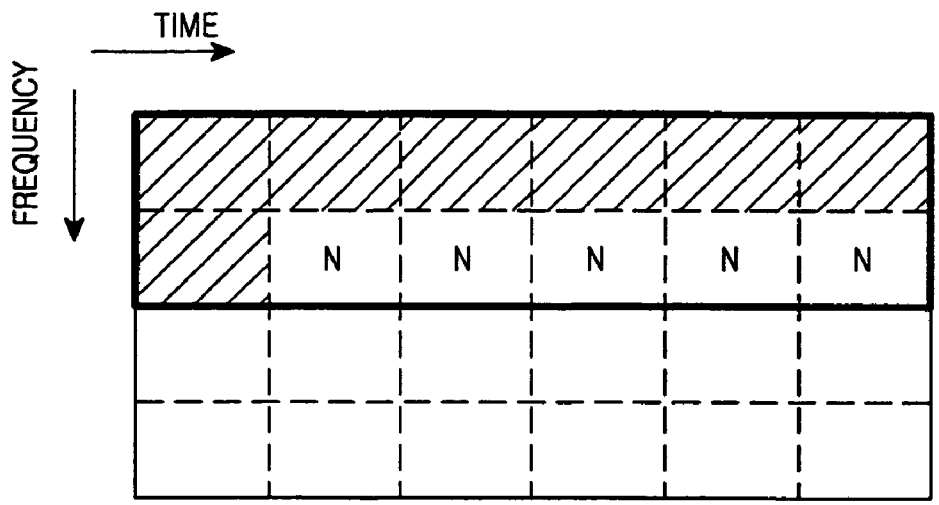
FIGS. 8A and 8B illustrate examples of burst allocation in a broadband wireless communication system according to an exemplary embodiment of the present invention.
Figure 8B:
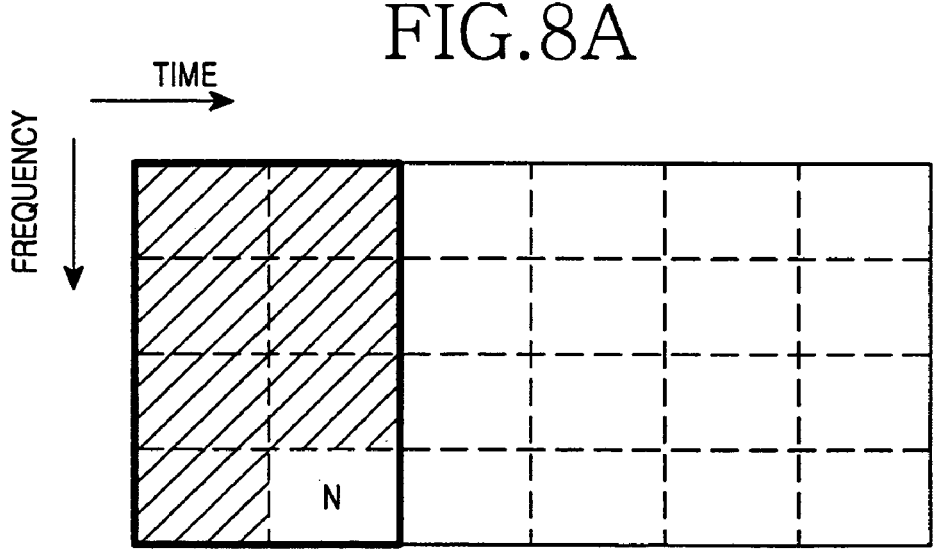

In step 425, the BS two-dimensionally allocates the selected nonMIMO&nonHARQ burst to the allocatable nonMIMO&nonHARQ region 212. That is, the BS allocates the selected nonMIMO&nonHARQ burst by using a start point, a frequency-axis length, and a time-axis length. In this case, the BS uses the entire time axis or the frequency axis in an available region included in the nonMIMO&nonHARQ region 212. That is, the BS allocates resources in a rectangular shape having a length corresponding to the Su{nonMIMO&nonHARQ} along the time axis or allocates resources in a rectangular shape having a length corresponding to the Fu{nonMIMO&nonHARQ} along the frequency axis. Accordingly, the remaining resource regions maintain a rectangular shape. In addition, the BS allocates resources so that an amount of null padding slot is minimized. The null padding slot implies a slot that does not include data in a resource allocated in a rectangular shape. That is, if a size of a nonMIMO&nonHARQ burst to be allocated is not the same as a size of a rectangle of which one side corresponds to the Fu{nonMIMO&nonHARQ} or the Su{nonMIMO&nonHARQ}, the null padding slot is generated. For example, if a burst has a size corresponding to 7 slots, a time axis of an available region corresponds to 6 symbols, and a frequency axis corresponds to 4 subchannels, then the entire time axis can be used as shown in FIG. 8A and the entire frequency axis can be used as shown in FIG. 8B. As shown in FIGS. 8A and 8B, a small amount of null slot padding is generated when the entire frequency axis is used. Therefore, the BS selects to use the entire frequency axis.

After allocating the selected nonMIMO&nonHARQ burst, proceeding to step 427, the BS updates Ru{nonMIMO&nonHARQ}, Fu{nonMIMO&nonHARQ}, and Su{nonMIMO&nonHARQ}. That is, the BS increases the Ru{nonMIMO&nonHARQ} by the number of null padding slots generated when the nonMIMO&nonHARQ burst is allocated in step 425, decreases the Fu{nonMIMO&nonHARQ} by a subchannel-axis size occupied by the nonMIMO&nonHARQ burst allocated in step 425, and decreases the Su{nonMIMO&nonHARQ} by a symbol-axis size occupied by the nonMIMO&nonHARQ burst allocated in step 425.

In step 429, the BS compares the Ru{nonMIMO&nonHARQ} with Ro{nonMIMO&nonHARQ}. In other words, the BS compares a maximum number of available null padding slots with the number of null padding slots actually accumulated by burst allocation. If the number of null padding slots actually accumulated is less than or equal to the maximum number of available null padding slots, returning to step 405, the BS repeats a burst allocation process on the nonMIMO&nonHARQ region 212.

Otherwise, if the number of null padding slots actually accumulated is greater than the maximum number of available null padding slots, proceeding to step 431, the BS compares a sum of subchannel-axis sizes of the nonMIMO zone 210 with a maximum number of subchannels per symbol. In other words, the BS compares a sum of the Fo{nonMIMO&nonHARQ} and the Fo{nonMIMO&HARQ} with the maximum number of subchannels per symbol.

If the sum of subchannel-axis sizes of the nonMIMO zone 210 is greater than or equal to the maximum number of subchannels per symbol, proceeding to step 433, the BS excludes a PDU having a lowest scheduling priority in the nonMIMO&nonHARQ region 212 from a list of allocatable bursts. In this case, the BS does not add a PDU having a scheduling priority subsequent to that of the excluded PDU to the list of allocatable bursts. Thereafter, returning to step 305 of FIG. 3, the BS re-estimates the MAP message size.

Otherwise, if the sum of the subchannel-axis sizes of the nonMIMO zone 210 is less than the maximum number of subchannels per symbol, proceeding to step 435, the BS increments the Fo{nonMIMO&nonHARQ} by 1. That is, the BS increments a subchannel-axis size of the nonMIMO&nonHARQ region 212 by 1. Therefore, since the number of available slots in the nonMIMO&nonHARQ region 212 varies due to a null padding slot generated in the burst allocation process, the Fo{nonMIMO&nonHARQ} calculated in step 401 may be different from the Fo{nonMIMO&nonHARQ} obtained after the burst allocation.

After incrementing the Fo{nonMIMO&nonHARQ} by 1, proceeding to step 437, the BS cancels the entire burst allocation in the nonMIMO&nonHARQ region 212, and then the procedure returns to step 405. That is, since a size of the nonMIMO&nonHARQ region 212 has changed, the BS newly starts to allocate bursts to the nonMIMO&nonHARQ region 212.

FIGS. 5A to 5D illustrate a process of allocating data bursts by a BS in a broadband wireless communication system according to a second embodiment of the present invention. In FIGS. 5A to 5D, bursts are allocated as shown in the burst allocation region 106 of the downlink frame of FIG. 2B.

Referring to FIGS. 5A to 5D, the BS calculates Fo{region}, No{region}, and Ro{region} of the sub-regions included in the nonMIMO zone 250 in step 501. In other words, the BS calculates the Fo{region}, No{region}, and Ro{region} for each of the nonMIMO&boosting region 252, the nonMIMO&normal region 254, the nonMIMO&deboosting region 256, and the nonMIMO&HARQ region 258. The Fo{region}, No{region}, and Ro{region} of the sub-regions included in the nonMIMO zone 250 are calculated according to Equation 1 above. If a sum of subchannel-axis sizes of the nonMIMO zone 250 or a sum of subchannel-axis sizes of the nonMIMO zone 250 based at least partly on power is greater than a maximum number of subchannels per symbol, the Fo{region} of one sub-region including a data burst with a lowest priority among the four sub-regions included in the nonMIMO zone 250 is determined relative to the remaining sub-regions. For example, if the sum of subchannel-axis sizes of the nonMIMO zone 250 or the sum of subchannel-axis sizes of the nonMIMO zone 250 based at least partly on power (that is, a sum of Fo{nonMIMO&boosting}, Fo{nonMIMO&normal}, Fo{nonMIMO&deboosting}, and Fo{nonMIMO&HARQ}) is greater than the maximum number of subchannels per symbol, or if a sum of Effective Power Fo{nonMIMO&boosting}, Effective Power Fo{nonMIMO&normal}, Effective Power Fo{nonMIMO&deboosting}, and Effective Power Fo{nonMIMO&HARQ} is greater than the maximum number of subchannels per symbol, and if the nonMIMQ&boosting region 252 includes the data burst with the lowest priority in the nonMIMO zone 250, the BS determines the Fo{nonMIMO&boosting} by subtracting the sum of Fo{nonMIMO&normal}, Fo{nonMIMO&deboosting}, and Fo{nonMIMO&HARQ} from the maximum number of subchannels per symbol based at least partly on power. In this case, Fu{region} of each region is initialized to Fo{region}, and Su{region} of each region is initialized to So{nonMIMO}.

The Effective Power Fo{region} is obtained by applying a gain caused by signal power to the number of physical subchannels, and can be calculated according to Equation 3 below:

$$\text{Effective Power} Fo\{\text{region}\} = \text{ceil}(\text{Effective Power Slot}\{\text{region}\}/\text{number of symbols in region})$$

$$\text{Effective Power Slot}\{\text{region}\} = \alpha \times N\{\text{region}\}. \quad [\text{Eqn. 3}]$$

In Equation 3 above, Effective Power Fo{region} denotes a minimum subchannel-axis size required to allocate N(<region>) based at least partly on power, ceil( ) denotes a ceiling operator, Effective Power Slot{region} denotes a total number of slots to be allocated to a 'region' based at least partly on power, $\alpha$ denotes a weight, and N{region} denotes a total number of slots to be allocated to the 'region'.

In Equation 3 above, the weight a varies according to a boosting or deboosting level applied to a corresponding region. For example, when boosting of '3 dB' is applied in the region, the weight a is set to 2, and when deboosting of '−3 dB' is applied in the region, the weight $\alpha$ is set to 0.5. That is, the weight $\alpha$ is a normal scale value having a signal power ratio that varies by boosting or deboosting.

In step 503, the BS calculates Fo{region}, No{region}, and Ro{region} of the sub-regions included in the MIMO zone 260. In other words, the BS calculates the Fo{region}, No{region}, and Ro{region} for each of the MIMO&boosting region 262, the MIMO&normal region 264, the MIMO&deboosting region 266, and the MIMO&HARQ region 268. The Fo{region}, No{region}, and Ro{region} of the sub-regions included in the MIMO zone 260 are calculated according to Equation 1 above. If a sum of subchannel-axis sizes of the MIMO zone 260 or a sum of subchannel-axis sizes of the MIMO zone 260 based at least partly on power is greater than a maximum number of subchannels per symbol, the Fo{region} of one region including a data burst with a lowest priority among the four sub-regions included in the MIMO zone 260 is determined relative to the remaining sub-regions. For example, if the sum of subchannel-axis sizes of the MIMO zone 260 or the sum of subchannel-axis sizes of the MIMO zone 260 based at least partly on power (that is, a sum of Fo{MIMO&boosting}, Fo{MIMO&normal}, Fo{MIMO&deboosting}, and Fo{MIMO&HARQ}) is greater than the maximum number of subchannels per symbol, or if a sum of Effective Power Fo{MIMO&boosting}, Effective Power Fo{MIMO&normal}, Effective Power Fo{MIMO&deboosting}, and Effective Power Fo{MIMO&HARQ} is greater than the maximum number of subchannels per symbol, and if the nonMIMO&boosting region 252 includes the data burst with the lowest priority in the MIMO zone 260, the BS determines the Fo{MIMO&boosting} by subtracting the sum of Fo{MIMO&normal}, Fo{MIMO&deboosting}, and Fo{MIMO&HARQ} from the maximum number of subchannels per symbol based at least partly on power. In this case, Fu{region} of each region is initialized to Fo{region}, and Su{region} of each region is initialized to So{MIMO}.

In steps 505 to 595, the BS two-dimensionally allocates nonMIMO&boosting bursts, nonMIMO&normal bursts, and nonMIMO&deboosting bursts which are concatenated by an MCS level in a descending order, and thereafter one-dimensionally allocates nonMIMO&HARQ bursts, MIMO&boosting bursts, MIMO&normal bursts, MIMO&deboosting bursts, and MIMO&HARQ bursts which are concatenated by a receiving MS according to a scheduling priority of each region. The two-dimensional allocation implies burst allocation as shown in FIG. 7A. The one-dimensional allocation implies burst allocation as shown in FIG. 7B.

After calculating the Fo{region}, No{region}, and Ro{region} of each region, proceeding to step 505, the BS determines whether a residual slot exists in the nonMIMO&boosting region 252 and also determines whether there exists a nonMIMO&boosting burst to be allocated.

If there is no residual slot in the nonMIMO&boosting region 252 or if there is no nonMIMO&boosting burst to be allocated, proceeding to step 507, the BS determines whether there is a residual slot in the nonMIMO&normal region 254 and also determines whether there is a nonMIMO&normal burst to be allocated.

If there is no residual slot in the nonMIMO&normal region 254 or if there is no nonMIMO&normal burst to be allocated, proceeding to step 509, the BS determines whether a residual slot exists in the nonMIMO&deboosting region 256 and also determines whether there exists a nonMIMO&deboosting burst to be allocated.

If there is no residual slot in the nonMIMO&deboosting region 256 or if there is no nonMIMO&deboosting burst to be allocated, proceeding to step 511, the BS allocates nonMIMO&HARQ bursts to the nonMIMO&HARQ region 258 according to the scheduling priority. That is, the BS allocates the nonMIMO&HARQ bursts by using a start point and an allocation length. However, the BS preferentially allocates an HARQ retransmission burst and thereafter allocates an HARQ initial transmission burst.

In step 513, the BS allocates the MIMO&boosting bursts, the MIMO&normal bursts, and the MIMO&deboosting bursts to the MIMO&boosting region 262, the MIMO&normal region 264, and the MIMO&deboosting region 266 according to the scheduling priority. That is, the BS allocates the MIMO&boosting bursts, the MIMO&normal bursts, and the MIMO&deboosting bursts by using a start point and an allocation length.

Figure 5A:
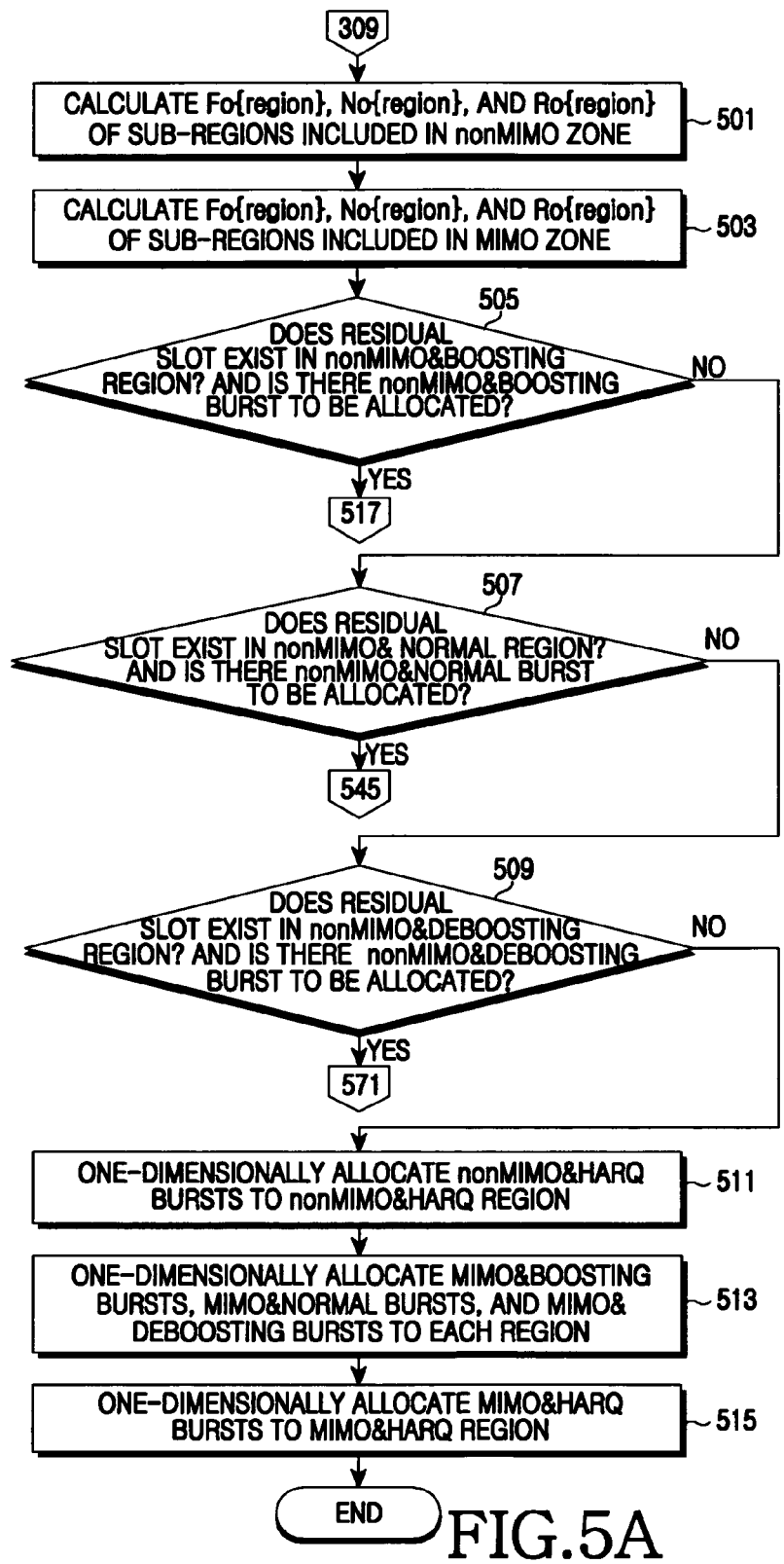
FIGS. 5A to 5D illustrate a process of allocating data bursts by a BS in a broadband wireless communication system according to a second embodiment of the present invention.
Figure 5B:
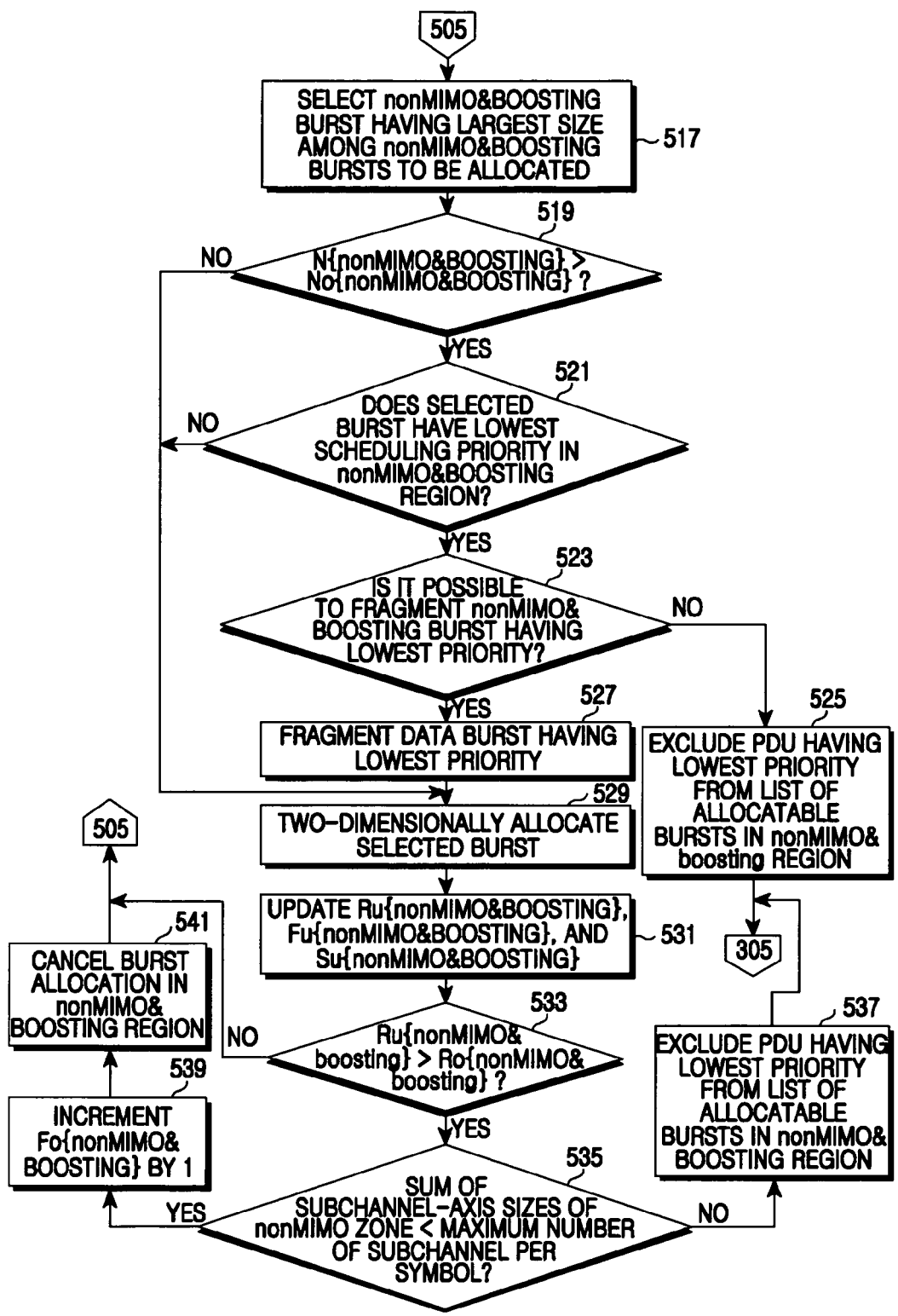
Figure 5C:
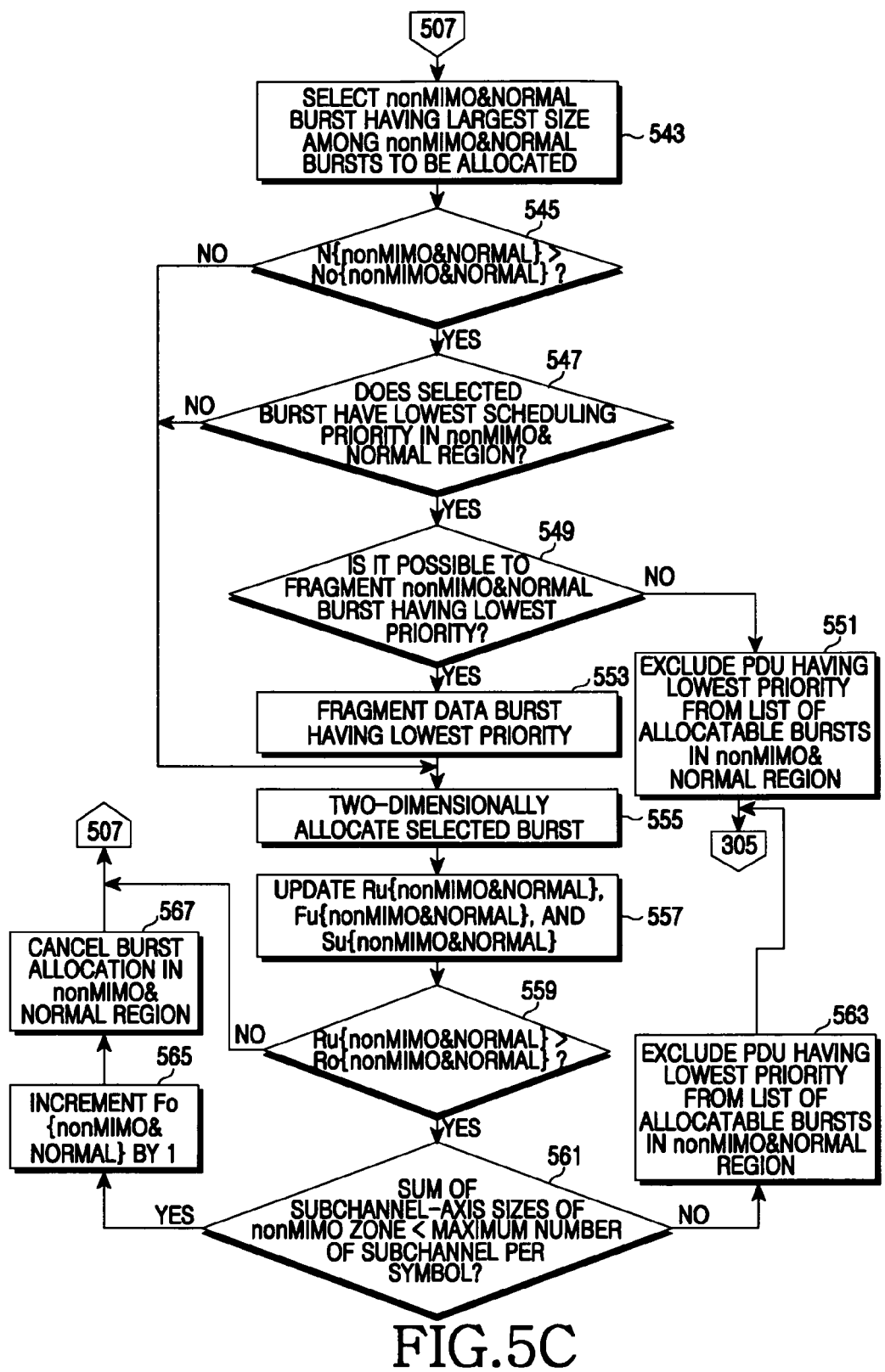
Figure 5D:
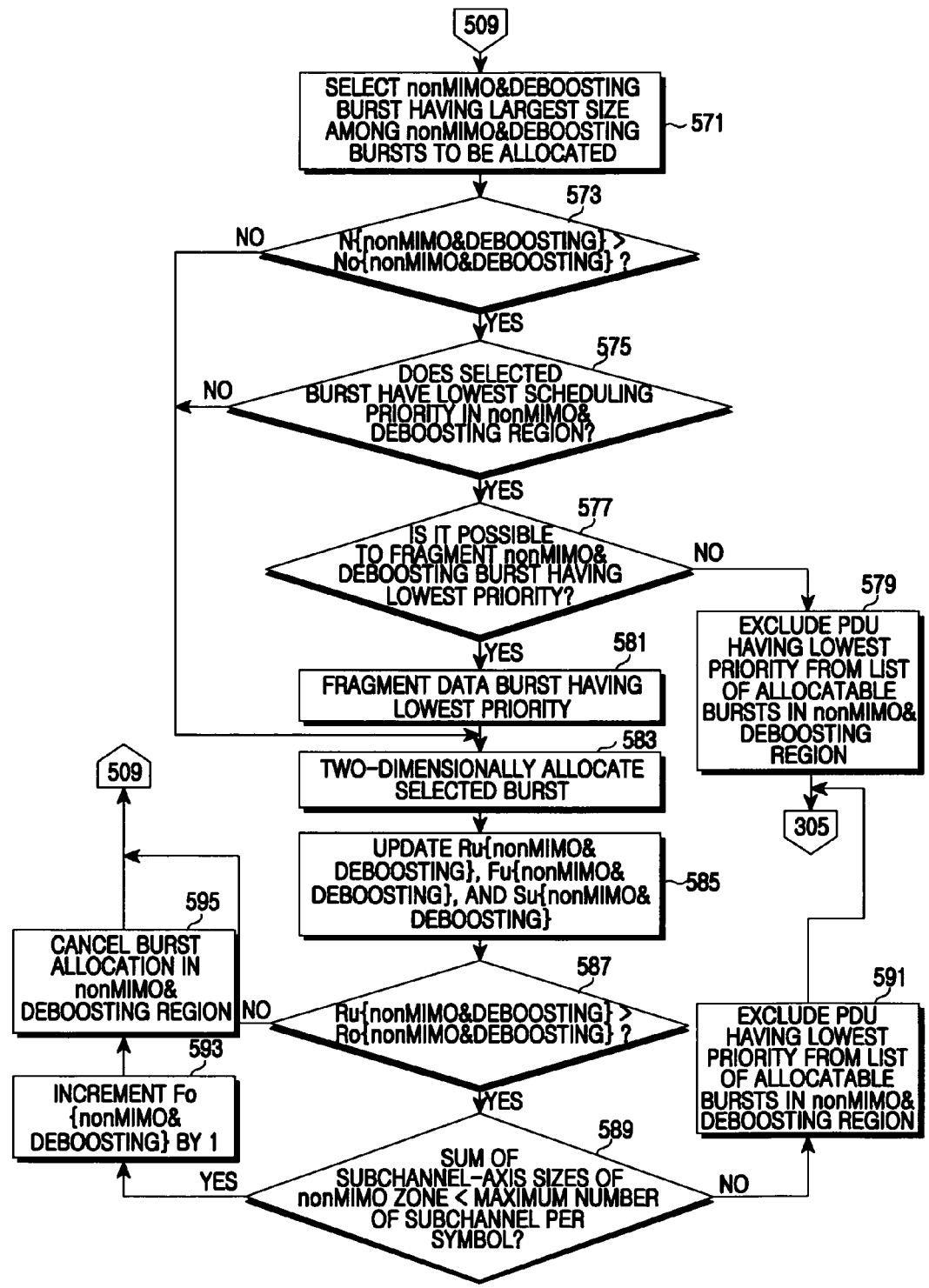

In step 515, the BS allocates the MIMO&HARQ bursts to the MIMO&HARQ region 268 according to the scheduling priority, and thereafter the procedure of FIG. 5A ends. That is, the BS allocates the MIMO&HARQ bursts by using a start point and an allocation length. However, the BS preferentially allocates an HARQ retransmission burst and thereafter allocates an HARQ initial transmission burst.

If the residual slot exists in the nonMIMO&boosting region 252 and also if there is the nonMIMO&boosting burst to be allocated in step 505, the BS operates as follows.

In step 517, the BS selects a nonMIMO&boosting burst having a largest size. That is, the BS selects the nonMIMO&boosting burst to be allocated.

In step 519, the BS compares N{nonMIMO&boosting} with No{nonMIMO&boosting}. In other words, the BS compares a total number of slots to be allocated to the nonMIMO&boosting region 252 with a total number of slots that can be allocated to the nonMIMO&boosting region 252 and that is recognized in a process of estimating a MAP message size. If the N{nonMIMO&boosting} is less than or equal to the No{nonMIMO&boosting}, the procedure proceeds to step 529.

If the N{nonMIMO&boosting} is greater than the No{nonMIMO&boosting}, proceeding to step 521, the BS determines whether a scheduling priority of the nonMIMO&boosting burst selected in step 517 is lowest in the nonMIMO&boosting region 252. If the scheduling priority of the selected nonMIMO&boosting burst is not lowest, the procedure proceeds to step 529.

If the scheduling priority of the selected nonMIMO&boosting burst is lowest, proceeding to step 523, the BS determines whether the selected nonMIMO&boosting burst can be fragmented. Whether fragmentation can be performed or not is determined according to a burst property. For example, a B-CID or an HARQ retransmission burst cannot be fragmented.

If the selected nonMIMO&boosting burst cannot be fragmented, proceeding to step 525, the BS excludes a PDU having a lowest scheduling priority in the nonMIMO&boosting region 252 from a list of allocatable bursts. In this case, the BS adds a PDU having a scheduling priority subsequent to that of the excluded PDU to the list of allocatable bursts. Thereafter, returning to step 305 of FIG. 3, the BS re-estimates the MAP message size.

If the selected nonMIMO&boosting burst can be fragmented, proceeding to step 527, the BS fragments the nonMIMO&boosting burst having the lowest priority. In this case, the nonMIMO&boosting burst having the lowest priority is fragmented into a size corresponding to the remaining slots other than slots to be occupied by other nonMIMO&boosting bursts having a higher priority than the nonMIMO&boosting burst having the lowest priority.

In step 529, the BS two-dimensionally allocates the selected nonMIMO&boosting burst to the allocatable nonMIMO&boosting region 252. That is, the BS allocates the selected nonMIMO&boosting burst by using a start point, a frequency-axis length, and a time-axis length. In this case, the BS uses the entire time axis or the frequency axis in an available region included in the nonMIMO&boosting region 252. That is, the BS allocates resources in a rectangular shape having a length corresponding to the Su{nonMIMO&boosting} along the time axis or allocates resources in a rectangular shape having a length corresponding to the Fu{nonMIMO&boosting} along the frequency axis. Accordingly, the remaining resource regions maintain a rectangular shape. In addition, the BS allocates resources so that an amount of a null padding slot is minimized. The null padding slot implies a slot that does not include data in a resource allocated in a rectangular shape. That is, if a size of a nonMIMO&boosting burst to be transmitted is not the same as a size of a rectangle of which one side corresponds to the Fu{nonMIMO&boosting} or the Su{nonMIMO&boosting}, the null padding slot is generated. For example, if a burst has a size corresponding to 7 slots, a time axis of an available region corresponds to 6 symbols, and a frequency axis corresponds to 4 subchannels, then the entire time axis can be used as shown in FIG. 8A and the entire frequency axis can be used as shown in FIG. 8B. As shown in FIG. 8, a small amount of null slot padding is generated when the entire frequency axis is used. Therefore, the BS selects to use the entire frequency axis.

After allocating the selected nonMIMO&boosting burst, proceeding to step 531, the BS updates Ru{nonMIMO&boosting}, Fu{nonMIMO&boosting}, and Su{nonMIMO&boosting}. That is, the BS increases the Ru{nonMIMO&boosting} by the number of null padding slots generated when the nonMIMO&boosting burst is allocated in step 527, decreases the Fu{nonMIMO&boosting} by a subchannel-axis size occupied by the nonMIMO&boosting burst allocated in step 527, and decreases the Su{nonMIMO&boosting} by a symbol-axis size occupied by the nonMIMO&boosting burst allocated in step 527.

In step 533, the BS compares the Ru{nonMIMO&boosting} with Ro{nonMIMO&boosting}. In other words, the BS compares a maximum number of available null padding slots with the number of null padding slots actually accumulated by burst allocation. If the number of null padding slots actually accumulated is less than or equal to the maximum number of available null padding slots, returning to step 505, the BS repeats a burst allocation process on the nonMIMO&boosting region 252.

Otherwise, if the number of null padding slots actually accumulated is greater than the maximum number of available null padding slots, proceeding to step 535, the BS compares a sum of subchannel-axis sizes of the nonMIMO zone 250 with a maximum number of subchannels per symbol. In other words, the BS compares a sum of the Fo{nonMIMO&boosting}, Fo{nonMIMO&normal}, Fo{nonMIMO&deboosting}, and Fo{nonMIMO&HARQ} with the maximum number of subchannels per symbol.

If the sum of subchannel-axis sizes of the nonMIMO zone 250 is greater than or equal to the maximum number of subchannels per symbol, proceeding to step 537, the BS excludes a PDU having a lowest scheduling priority and included in the nonMIMO&boosting bursts from a list of allocatable bursts. In this case, the BS does not add a PDU having a scheduling priority subsequent to that of the excluded PDU to the list of allocatable bursts. Thereafter, returning to step 305 of FIG. 3, the BS re-estimates the MAP message size.

Otherwise, if the sum of the Fo{nonMIMO&boosting}, Fo{nonMIMO&normal}, Fo{nonMIMO&deboosting}, and Fo{nonMIMO&HARQ} is less than the total number of subchannels per symbol, proceeding to step 539, the BS increments the Fo{nonMIMO&boosting} by 1. That is, the BS increments a subchannel-axis size of the nonMIMO&boosting region 252 by 1. Therefore, since the number of available slots in the nonMIMO&boosting region 252 varies due to a null padding slot generated in the burst allocation process, the Fo{nonMIMO&boosting} calculated in step 501 may be different from the Fo{nonMIMO&boosting} obtained after the burst allocation.

After incrementing the Fo{nonMIMO&boosting} by 1, proceeding to step 541, the BS cancels the entire burst allocation in the nonMIMO&boosting region 252, and then the procedure returns to step 505. That is, since a size of the nonMIMO&boosting region 252 has changed, the BS newly starts to allocate bursts to the nonMIMO&boosting region 252.

If the residual slot exists in the nonMIMO&normal region 254 and also if there is the nonMIMO&normal burst to be allocated in step 507, the BS operates as follows.

In step 543, the BS selects a nonMIMO&normal burst having a largest size. That is, the BS selects the nonMIMO&normal burst to be allocated.

In step 545, the BS compares N{nonMIMO&normal} with No{nonMIMO&normal}. In other words, the BS compares a total number of slots to be allocated to the nonMIMO&normal region 254 with a total number of slots that can be allocated to the nonMIMO&normal region 254 and that is recognized in a process of estimating a MAP message size. If the N{nonMIMO&normal} is less than or equal to the No{nonMIMO&normal}, the procedure proceeds to step 555.

If the N{nonMIMO&normal} is greater than the No{nonMIMO&normal}, proceeding to step 547, the BS determines whether a scheduling priority of the nonMIMO&normal burst selected in step 543 is lowest in the nonMIMO&normal region 254. If the scheduling priority of the selected nonMIMO&normal burst is not lowest, the procedure proceeds to step 555.

If the scheduling priority of the selected nonMIMO&normal burst is lowest, proceeding to step 549, the BS determines whether the selected nonMIMO&normal burst can be fragmented. Whether fragmentation can be performed or not is determined according to a burst property. For example, a B-CID or an HARQ retransmission burst cannot be fragmented.

If the selected nonMIMO&normal burst cannot be fragmented, proceeding to step 551, the BS excludes a PDU having a lowest scheduling priority in the nonMIMO&normal region 254 from a list of allocatable bursts. In this case, the BS adds a PDU having a scheduling priority subsequent to that of the excluded PDU to the list of allocatable bursts. Thereafter, returning to step 305 of FIG. 3, the BS re-estimates the MAP message size.

If the nonMIMO&normal burst having the lowest priority can be fragmented in step 549, proceeding to step 553, the BS fragments the nonMIMO&normal burst having the lowest priority. In this case, the nonMIMO&normal burst having the lowest priority is fragmented into a size corresponding to the remaining slots other than slots to be occupied by other nonMIMO&normal bursts having a higher priority than the nonMIMO&normal burst having the lowest priority.

In step 555, the BS two-dimensionally allocates the selected nonMIMO&normal burst to the allocatable nonMIMO&normal region 254. That is, the BS allocates the selected nonMIMO&normal burst by using a start point, a frequency-axis length, and a time-axis length. In this case, the BS uses the entire time axis or the frequency axis in an available region included in the nonMIMO&normal region 254. That is, the BS allocates resources in a rectangular shape having a length corresponding to the Su{nonMIMO&normal} along the time axis or allocates resources in a rectangular shape having a length corresponding to the Fu{nonMIMO&normal} along the frequency axis. Accordingly, the remaining resource regions maintain a rectangular shape. In addition, the BS allocates resources so that an amount of a null padding slot is minimized. The null padding slot implies a slot that does not include data in a resource allocated in a rectangular shape. That is, if a size of a nonMIMO&normal burst to be transmitted is not the same as a size of a rectangle of which one side corresponds to the Fu{nonMIMO&normal} or the Su{nonMIMO&normal}, the null padding slot is generated. For example, if a burst has a size corresponding to 7 slots, a time axis of an available region corresponds to 5 symbols, and a frequency axis corresponds to 5 subchannels, then the entire time axis can be used as shown in FIG. 8A and the entire frequency axis can be used as shown in FIG. 8B. As shown in FIGS. 8A and 8B, a small amount of null slot padding is generated when the entire frequency axis is used. Therefore, the BS selects to use the entire frequency axis.

After allocating the selected nonMIMO&normal burst, proceeding to step 557, the BS updates Ru{nonMIMO&normal}, Fu{nonMIMO&normal}, and Su{nonMIMO&normal}. That is, the BS increases the Ru{nonMIMO&normal} by the number of null padding slots generated when the nonMIMO&normal burst is allocated in step 553, decreases the Fu{nonMIMO&normal} by a subchannel-axis size occupied by the nonMIMO&normal burst allocated in step 553, and decreases the Su{nonMIMO&normal} by a symbol-axis size occupied by the nonMIMO&normal burst allocated in step 553.

In step 559, the BS compares the Ru{nonMIMO&normal} with Ro{nonMIMO&normal}. In other words, the BS compares a maximum number of available null padding slots with the number of null padding slots actually accumulated by burst allocation. If the number of null padding slots actually accumulated is less than or equal to the maximum number of available null padding slots, returning to step 507, the BS repeats a burst allocation process on the nonMIMO&normal region 254.

Otherwise, if the number of null padding slots actually accumulated is greater than the maximum number of available null padding slots, proceeding to step 561, the BS compares a sum of subchannel-axis sizes of the nonMIMO zone 250 with a maximum number of subchannels per symbol. In other words, the BS compares a sum of the Fo{nonMIMO&boosting}, Fo{nonMIMO&normal}, Fo{nonMIMO&deboosting}, and Fo{nonMIMO&HARQ} with the maximum number of subchannels per symbol.

If the sum of subchannel-axis sizes of the nonMIMO zone 250 is greater than or equal to the maximum number of subchannels per symbol, proceeding to step 563, the BS excludes a PDU having a lowest scheduling priority and included in the nonMIMO&normal bursts from a list of allocatable bursts. In this case, the BS does not add a PDU having a scheduling priority subsequent to that of the excluded PDU to the list of allocatable bursts. Thereafter, returning to step 305 of FIG. 3, the BS re-estimates the MAP message size.

Otherwise, if the sum of the Fo{nonMIMO&boosting}, Fo{nonMIMO&normal}, and Fo{nonMIMO&deboosting is less than the total number of subchannels per symbol, proceeding to step 565, the BS increments the Fo{nonMIMO&normal} by 1. That is, the BS increments a subchannel-axis size of the nonMIMO&normal region 254 by 1. Therefore, since the number of available slots in the nonMIMO&normal region 254 varies due to a null padding slot generated in the burst allocation process, the Fo{nonMIMO&normal} calculated in step 501 may be different from the Fo{nonMIMO&normal} obtained after the burst allocation.

After incrementing the Fo{nonMIMO&normal} by 1, proceeding to step 567, the BS cancels the entire burst allocation in the nonMIMO&normal region 254, and then the procedure returns to step 507. That is, since a size of the nonMIMO&normal region 254 has changed, the BS newly starts to allocate bursts to the nonMIMO&normal region 254.

If the residual slot exits in the nonMIMO&deboosting region 256 and also if there is the nonMIMO&deboosting burst to be allocated in step 509, the BS operates as follows.

In step 571, the BS selects a nonMIMO&deboosting burst having a largest size. That is, the BS selects the nonMIMO&deboosting burst to be allocated.

In step 573, the BS compares N{nonMIMO&deboosting} with No{nonMIMO&deboosting}. In other words, the BS compares a total number of slots to be allocated to the nonMIMO&deboosting region 256 with a total number of slots that can be allocated to the nonMIMO&deboosting region 256 and that is recognized in a process of estimating a MAP message size. If the N{nonMIMO&deboosting} is less than or equal to the No{nonMIMO&deboosting}, the procedure proceeds to step 583.

If the N{nonMIMO&deboosting} is greater than the No{nonMIMO&deboosting}, proceeding to step 575, the BS determines whether a scheduling priority of the nonMIMO&deboosting burst selected in step 571 is lowest in the nonMIMO&deboosting region 256. If the scheduling priority of the selected nonMIMO&deboosting burst is not lowest, the procedure proceeds to step 583.

If the scheduling priority of the selected nonMIMO&deboosting burst is lowest, proceeding to step 577, the BS determines whether the selected nonMIMO&deboosting burst can be fragmented. Whether fragmentation can be performed or not is determined according to a burst property. For example, a B-CID or an HARQ retransmission burst cannot be fragmented.

If the selected nonMIMO&deboosting burst cannot be fragmented, proceeding to step 579, the BS excludes a PDU having a lowest scheduling priority in the nonMIMO&deboosting region 256 from a list of allocatable bursts. In this case, the BS adds a PDU having a scheduling priority subsequent to that of the excluded PDU to the list of allocatable bursts. Thereafter, returning to step 305 of FIG. 3, the BS re-estimates the MAP message size.

If the nonMIMO&deboosting burst having the lowest priority can be fragmented, proceeding to step 581, the BS fragments the nonMIMO&deboosting burst having the lowest priority. In this case, the nonMIMO&deboosting burst having the lowest priority is fragmented into a size corresponding to the remaining slots other than slots to be occupied by other nonMIMO&deboosting bursts having a higher priority than the nonMIMO&deboosting burst having the lowest priority.

In step 583, the BS two-dimensionally allocates the selected nonMIMO&deboosting burst to the allocatable nonMIMO&deboosting region 256. That is, the BS allocates the selected nonMIMO&deboosting burst by using a start point, a frequency-axis length, and a time-axis length. In this case, the BS uses the entire time axis or the frequency axis in an available region included in the nonMIMO&deboosting region 256. That is, the BS allocates resources in a rectangular shape having a length corresponding to the Su{nonMIMO&deboosting} along the time axis or allocates resources in a rectangular shape having a length corresponding to the Fu{nonMIMO&deboosting} along the frequency axis. Accordingly, the remaining resource regions maintain a rectangular shape. In addition, the BS allocates resources so that an amount of a null padding slot is minimized. The null padding slot implies a slot that does not include data in a resource allocated in a rectangular shape. That is, if a size of a nonMIMO&deboosting burst to be transmitted is not the same as a size of a rectangle of which one side corresponds to the Fu{nonMIMO&deboosting} or the Su{nonMIMO&deboosting}, the null padding slot is generated. For example, if a burst has a size corresponding to 7 slots, a time axis of an available region corresponds to 6 symbols, and a frequency axis corresponds to 4 subchannels, then the entire time axis can be used as shown in FIG. 8A and the entire frequency axis can be used as shown in FIG. 8B. As shown in FIGS. 8A and 8B, a small amount of null slot padding is generated when the entire frequency axis is used. Therefore, the BS selects to use the entire frequency axis.

After allocating the selected nonMIMO&deboosting burst, proceeding to step 585, the BS updates Ru{nonMIMO&deboosting}, Fu{nonMIMO&deboosting}, and Su{nonMIMO&deboosting}. That is, the BS increases the Ru{nonMIMO&deboosting} by the number of null padding slots generated when the nonMIMO&deboosting burst is allocated in step 583, decreases the Fu{nonMIMO&deboosting} by a subchannel-axis size occupied by the nonMIMO&deboosting burst allocated in step 583, and decreases the Su{nonMIMO&deboosting} by a symbol-axis size occupied by the nonMIMO&deboosting burst allocated in step 583.

In step 587, the BS compares the Ru{nonMIMO&deboosting} with Ro{nonMIMO&deboosting}. In other words, the BS compares a maximum number of available null padding slots with the number of null padding slots actually accumulated by burst allocation. If the number of null padding slots actually accumulated is less than or equal to the maximum number of available null padding slots, returning to step 509, the BS repeats a burst allocation process on the nonMIMO&deboosting region 256.

Otherwise, if the number of null padding slots actually accumulated is greater than the maximum number of available null padding slots, proceeding to step 589, the BS compares a sum of subchannel-axis sizes of the nonMIMO zone 250 with a maximum number of subchannels per symbol. In other words, the BS compares a sum of the Fo{nonMIMO&boosting}, Fo{nonMIMO&normal}, Fo{nonMIMO&deboosting}, and Fo{nonMIMO&HARQ} with the maximum number of subchannels per symbol.

If the sum of subchannel-axis sizes of the nonMIMO zone 250 is greater than or equal to the maximum number of subchannels per symbol, proceeding to step 591, the BS excludes a PDU having a lowest scheduling priority and included in the nonMIMO&deboosting bursts from a list of allocatable bursts. In this case, the BS does not add a PDU having a scheduling priority subsequent to that of the excluded PDU to the list of allocatable bursts. Thereafter, returning to step 305 of FIG. 3, the BS re-estimates the MAP message size.

Otherwise, if the sum of the Fo{nonMIMO&boosting}, Fo{nonMIMO&normal}, and Fo{nonMIMO&deboosting is less than the total number of subchannels per symbol, proceeding to step 593, the BS increments the Fo{nonMIMO&deboosting} by 1. That is, the BS increments a subchannel-axis size of the nonMIMO&deboosting region 256 by 1. Therefore, since the number of available slots in the nonMIMO&deboosting region 256 varies due to a null padding slot generated in the burst allocation process, the Fo{nonMIMO&deboosting} calculated in step 501 may be different from the Fo{nonMIMO&deboosting} obtained after the burst allocation.

After incrementing the Fo{nonMIMO&deboosting} by 1, proceeding to step 595, the BS cancels the entire burst allocation in the nonMIMO&deboosting region 256, and then the procedure returns to step 509. That is, since a size of the nonMIMO&deboosting region 256 has changed, the BS newly starts to allocate bursts to the nonMIMO&deboosting region 256.

Figure 6:
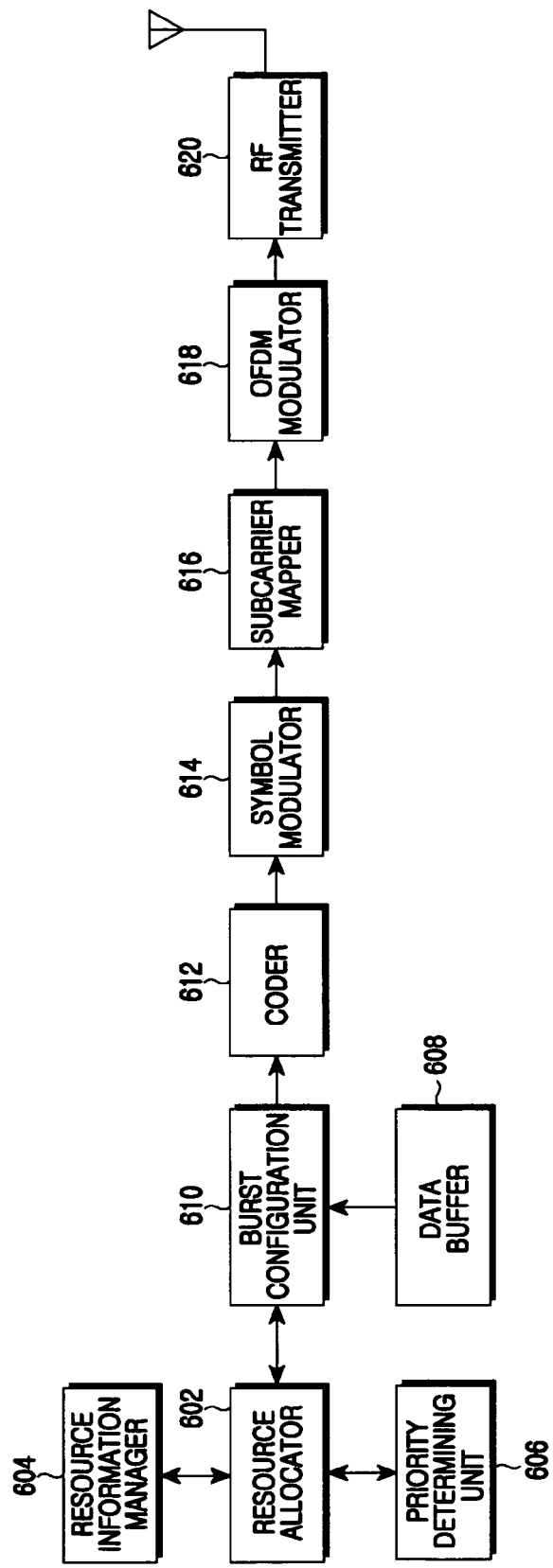
FIG. 6 is a block diagram illustrating a BS in a broadband wireless communication system according to an exemplary embodiment of the present invention.

FIG. 6 is a block diagram illustrating a BS in a broadband wireless communication system according to an exemplary embodiment of the present invention.

Referring to FIG. 6, the BS includes a resource allocator 602, a resource information manager 604, a priority determining unit 606, a data buffer 608, a burst configuration unit 610, a coder 612, a symbol modulator 614, a subcarrier mapper 616, an OFDM modulator 618, and a Radio Frequency (RF) transmitter 620.

The resource allocator 602 allocates resources of a downlink period and an uplink period to MSs connected to the BS. That is, the resource allocator 602 allocates bursts to be transmitted to the MSs to the downlink period, and allocates bursts received from the MSs to the uplink period. In particular, according to the present invention, in a process of allocating downlink bursts, the resource allocator 602 considers priorities among a nonMIMO burst, a MIMO burst, a nonHARQ burst, an HARQ burst, power boosting, power deboosting, and a data burst.

The resource information manager 604 classifies the downlink period of a frame according to a burst property, and stores and maintains the classification information. Further, the resource information manager 604 calculates temporary resource state information generated during the burst allocation process, and stores and maintains the calculation result. For example, the resource information manager 604 stores and maintains information shown in Table 1 above.

The priority determining unit 606 determines priorities among PDUs to be transmitted and priorities among data bursts consisting of the PDUs. For example, the priority determining unit 606 determines the priorities among the PDUs according to a service class of a service flow corresponding to the PDUs and a user class of a receiving MS. Further, the priority determining unit 606 determines the priorities among data bursts according to the priority of the PDU included in the data bursts. That is, the priority determining unit 606 determines the priorities among the data bursts according to a priority of each PDU which has a lowest priority among the PDUs included in the data burst.

The data buffer 608 stores the PDUs to be transmitted, and provides the PDUs to the burst configuration unit 610. The burst configuration unit 610 configures the data bursts by using the PDUs provided by the data buffer 608. The burst configuration unit 610 configures the PDUs transmitted to the same MS (that is, the PDUs including the same B-CID) into one data burst. Further, the burst configuration unit 610 configures the PDUs applied with the same MCS level into one data burst.

The coder 612 performs channel-coding on an information bit-stream provided from the burst configuration unit 610. The symbol modulator 614 converts the channel-coded bit-stream into complex symbols by performing modulation. The subcarrier mapper 616 maps the complex symbols to a frequency domain according to a burst allocation result of the resource allocator 602. The OFDM modulator 618 converts the complex symbols mapped to the frequency domain into a time-domain signal by performing an Inverse Fast Fourier Transform (IFFT) operation, and configures an OFDM symbol by inserting a Cyclic Prefix (CP). The RF transmitter 620 up-converts a baseband signal into an RF signal, and transmits the RF signal through an antenna.

Now, an operation of the BS will be described according to the structure shown in FIG. 6.

First, the priority determining unit 606 determines priorities of PDUs to be transmitted. The resource information manager 604 divides a downlink period into a plurality of regions according to a burst property. For example, the resource information manager 604 divides the downlink period into a plurality of regions as shown in FIG. 2A or FIG. 2B. Further, the resource information manager 604 estimates an overhead caused by a MAP message. The burst configuration unit 610 configures data bursts by using the PDUs. The priority determining unit 606 determines priorities among the data bursts.

Thereafter, the resource information manager 604 calculates Fo{region}, No{region}, and Ro{region} of the sub-regions included in the nonMIMO zone 210. In other words, the resource information manager 604 calculates the Fo{region}, No{region}, and Ro{region} for each of the nonMIMO&nonHARQ region 212 and the nonMIMO&HARQ region 214. The Fo{region}, No{region}, and Ro{region} of the sub-regions included in the nonMIMO zone 210 are calculated according to Equation 1 above. If a sum of subchannel-axis sizes of the nonMIMO zone 210 is greater than a maximum number of subchannels per symbol, the Fo{region} of one sub-region including a data burst with a lowest priority between the two sub-regions included in the nonMIMO zone 210 is determined relative to the other sub-region. For example, if a sum of subchannel-axis sizes of the nonMIMO zone 210 (that is, a sum of Fo{nonMIMO&nonHARQ} and Fo{nonMIMO&HARQ}) is greater than the maximum number of subchannels per symbol and if the nonMIMO&HARQ region 214 includes the data burst with the lowest priority in the nonMIMO zone 210, the resource information manager 604 determines the Fo{nonMIMO&HARQ} by subtracting the Fo{nonMIMO&nonHARQ} from the maximum number of subchannels per symbol. In this case, Fu{region} is initialized to Fo{region}, and Su{region} is initialized to So{nonMIMO}.

The resource information manager 604 calculates Fo{region}, No{region}, and Ro{region} of the sub-regions included in the MIMO zone 220. In other words, the resource information manager 604 calculates the Fo{region}, No{region}, Ro{region} for each of the MIMO&nonHARQ region 222 and the MIMO&HARQ region 224. The Fo{region}, No{region}, and Ro{region} of the sub-regions included in the MIMO zone 220 are calculated according to Equation 2 below. If a sum of subchannel-axis sizes of the nonMIMO zone 220 is greater than a maximum number of subchannels per symbol, Fo{region} of one sub-region including data bursts with a lowest priority between the two sub-regions included in the nonMIMO zone 220 is determined relative to the other sub-region. For example, if a sum of subchannel-axis sizes of the MIMO zone 220 (that is, a sum of Fo{MIMO&nonHARQ} and Fo{MIMO&HARQ}) is greater than the maximum number of subchannels per symbol and if the MIMO&HARQ region 224 includes the data burst with the lowest priority in the MIMO zone 220, the resource information manager 604 determines the Fo{MIMO&HARQ} by subtracting the Fo{MIMO&nonHARQ} from the maximum number of subchannels per symbol. In this case, Fu{region} is initialized to Fo{region}, and Su{region} is initialized to So{MIMO}.

Thereafter, the resource allocator 602 preferentially allocates bursts of a region to which two-dimensional allocation is applied. For example, when the regions are divided as shown in FIG. 2A, the resource allocator 602 preferentially allocates the nonMIMO&nonHARQ bursts, and when the regions are divided as shown in FIG. 2B, the resource allocator 602 sequentially allocates the nonMIMO&boosting bursts, the nonMIMO&normal bursts, and the nonMIMO&deboosting bursts. Then, the resource allocator 602 allocates bursts of a region to which one-dimensional allocation is applied. Since the same burst allocation process is performed on each region to which the two-dimensional allocation is applied, an operation of each functional block shown in FIG. 6 is described by taking an example of the nonMIMO&nonHARQ region 212. The two-dimensional allocation implies burst allocation as shown in FIG. 7A. The one-dimensional allocation implies burst allocation as shown in FIG. 7B.

To allocate the nonMIMO&nonHARQ bursts, by using a resource status information stored in the resource information manager 604, the resource allocator 602 determines whether a residual slot exists in the nonMIMO&nonHARQ region 212 and also determines whether there exists a nonMIMO&nonHARQ burst to be allocated. If there is no residual slot in the nonMIMO&nonHARQ region 212 or if there is no nonMIMO&nonHARQ burst to be allocated, the resource allocator 602 one-dimensionally allocates the nonMIMO&HARQ bursts, MIMO&nonHARQ bursts, MIMO&HARQ bursts to corresponding regions, and thereafter ends the burst allocation process. As for the nonMIMO&HARQ region 214 and the MIMO&HARQ region 224, the resource allocator 602 preferentially allocates an HARQ retransmission burst and thereafter allocates an HARQ initial transmission burst.

On the other hand, if the residual slot exists in the nonMIMO&nonHARQ region 212 and also if there is the nonMIMO&nonHARQ burst to be allocated, the resource allocator 602 selects a nonMIMO&nonHARQ burst having a largest size. That is, the resource allocator 602 selects the nonMIMO&nonHARQ burst to be allocated. Subsequently, the resource allocator 602 compares N{nonMIMO&nonHARQ} with No{nonMIMO&nonHARQ}. In other words, the resource allocator 602 compares a total number of slots to be allocated to the nonMIMO&nonHARQ region 212 with a total number of slots that can be allocated to the nonMIMO&nonHARQ region 212 and that is recognized in a process of estimating a MAP message size.

If the N{nonMIMO&nonHARQ} is less than or equal to the No{nonMIMO&nonHARQ}, the resource allocator 602 two-dimensionally allocates the selected nonMIMO&nonHARQ burst to the allocatable nonMIMO&nonHARQ region 212. That is, the resource allocator 602 allocates the selected nonMIMO&nonHARQ burst by using a start point, a frequency-axis length, and a time-axis length. In this case, the resource allocator 602 uses the entire time axis or the frequency axis in an available region included in the nonMIMO&nonHARQ region 212. That is, the resource allocator 602 allocates resources in a rectangular shape having a length corresponding to the Su{nonMIMO&nonHARQ} along the time axis or allocates resources in a rectangular shape having a length corresponding to the Fu{nonMIMO&nonHARQ} along the frequency axis. Accordingly, the remaining resource regions maintain a rectangular shape. In addition, the resource allocator 602 allocates resources so that an amount of a null padding slot is minimized. The null padding slot implies a slot that does not include data in a resource allocated in a rectangular shape. That is, if a size of a nonMIMO&nonHARQ burst to be allocated is not the same as a size of a rectangle of which one side corresponds to the Fu{nonMIMO&nonHARQ} or the Su{nonMIMO&nonHARQ}, the null padding slot is generated. For example, if a burst has a size corresponding to 7 slots, a time axis of an available region corresponds to 6 symbols, and a frequency axis corresponds to 4 subchannels, then the entire time axis can be used as shown in FIG. 8A and the entire frequency axis can be used as shown in FIG. 8B. As shown in FIGS. 8A and 8B, a small amount of null slot padding is generated when the entire frequency axis is used. Therefore, in this case, the resource allocator 602 selects to use the entire frequency axis.

Otherwise, if the No{nonMIMO&nonHARQ} is greater than the No{nonMIMO&nonHARQ}, the resource allocator 602 determines whether a scheduling priority of the selected nonMIMO&nonHARQ burst is lowest in the nonMIMO&nonHARQ region 212. If the scheduling priority of the selected nonMIMO&nonHARQ burst is not lowest, the resource allocator 602 two-dimensionally allocates the selected nonMIMO&nonHARQ burst to the nonMIMO&nonHARQ region 212 as described above. Otherwise, if the scheduling priority of the selected nonMIMO&nonHARQ burst is lowest, the resource allocator 602 determines whether the selected nonMIMO&nonHARQ burst can be fragmented. Whether fragmentation can be performed or not is determined according to a burst property. For example, a B-CID or an HARQ retransmission burst cannot be fragmented. If the selected nonMIMO&nonHARQ burst cannot be fragmented, the resource allocator 602 excludes a PDU having a lowest scheduling priority in the nonMIMO&nonHARQ region 212 from a list of allocatable bursts. In this case, the resource allocator 602 adds a PDU having a scheduling priority subsequent to that of the excluded PDU to the list of allocatable bursts. Thereafter, the resource information manager 604 re-estimates the MAP-message size, and the resource allocator 602 re-starts the burst allocation process. If the selected nonMIMO&nonHARQ burst can be fragmented, the resource allocator 602 fragments the selected nonMIMO&nonHARQ burst. In this case, the nonMIMO&nonHARQ burst having the lowest priority is fragmented into a size corresponding to the remaining slots other than slots to be occupied by other nonMIMO&nonHARQ bursts having a higher priority than the nonMIMO&nonHARQ burst having the lowest priority. Then, as described above, the resource allocator 602 two-dimensionally allocates the selected nonMIMO&nonHARQ burst to the allocatable nonMIMO&nonHARQ region 212.

After allocating the selected nonMIMO&nonHARQ burst, the resource information manager 604 updates Ru{nonMIMO&nonHARQ}, Fu{nonMIMO&nonHARQ}, and Su{nonMIMO&nonHARQ}. That is, the resource information manager 604 increases the Ru{nonMIMO&nonHARQ} by the number of null padding slots generated when the nonMIMO&nonHARQ burst is allocated, decreases the Fu{nonMIMO&nonHARQ} by a subchannel-axis size occupied by the allocated nonMIMO&nonHARQ burst, and decreases the Su{nonMIMO&nonHARQ} by a symbol-axis size occupied by the allocated nonMIMO&nonHARQ burst.

Subsequently, the resource allocator 602 compares Ru{nonMIMO&nonHARQ} with Ro{nonMIMO&nonHARQ}. In other words, the resource allocator 602 compares a maximum number of available null padding slots with the number of null padding slots actually accumulated by burst allocation. If the number of null padding slots actually accumulated is less than or equal to the maximum number of available null padding slots, the resource allocator 602 selects a nonMIMO&nonHARQ burst to be allocated next according to a scheduling priority, and then repeats the aforementioned operation.

Otherwise, if the number of null padding slots actually accumulated is greater than the maximum number of available null padding slots, the resource allocator 602 compares a sum of subchannel-axis sizes of the nonMIMO zone 210 with a maximum number of subchannels per symbol. In other words, the resource allocator 602 compares a sum of the Fo{nonMIMO&nonHARQ} and the Fo{nonMIMO&HARQ} with the maximum number of subchannels per symbol. If the sum of subchannel-axis sizes of the nonMIMO zone 210 is greater than or equal to the maximum number of subchannels per symbol, the resource allocator 602 excludes a PDU having a lowest scheduling priority in the nonMIMO&nonHARQ region 212 from a list of allocatable bursts. In this case, the resource allocator 602 does not add a PDU having a scheduling priority subsequent to that of the excluded PDU to the list of allocatable bursts. Thereafter, the resource information manager 604 re-estimates the MAP-message size, and the resource allocator 602 re-starts the burst allocation process. Otherwise, if the sum of the subchannel-axis sizes of the nonMIMO zone 210 is less than the maximum number of subchannels per symbol, the resource allocator 602 increments the Fo{nonMIMO&nonHARQ} by 1. That is, the resource allocator 602 increments a subchannel-axis size of the nonMIMO&nonHARQ region 212 by 1. Subsequently, the resource allocator 602 cancels the entire burst allocation in the nonMIMO&nonHARQ region 212, and then newly starts to allocate bursts to the nonMIMO&nonHARQ region 212.

According to exemplary embodiments of the present invention, a downlink period is divided into a plurality of regions according to a burst property, and waste of resources is minimized by considering a data burst size for each region and the number of slots to be null padded. Therefore, efficiency of burst allocation is maximized.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method of allocating bursts in a wireless communication system, the method comprising:
dividing a downlink period into a plurality of regions according to a burst property;
calculating a residual symbol axis size and a residual subchannel axis size of a first region conforming to a two-dimensional allocation from among the plurality of regions;
allocating bursts to be allocated to the first region in a descending order of burst size, the bursts being allocated in at least one of a rectangular shape having a length corresponding to the number of residual symbols along a time axis and in a rectangular shape having a length corresponding to the number of residual subchannels along a frequency axis; and
allocating bursts to at least one of the regions conforming to a one-dimensional allocation according to a scheduling priority,
wherein the plurality of regions are divided along the time axis into a Multiple Input Multiple Output (MIMO) zone for transmitting a burst conforming to a MIMO scheme and a nonMIMO zone for transmitting a burst conforming to a Single Input Single Output (SISO) scheme or a Single Input Multiple Output (SIMO) scheme.

2. The method of claim 1, wherein allocating bursts to the first region comprises allocating the bursts such that a number of generated null padding slots is minimized.

3. The method of claim 1, further comprising:
updating the residual symbol axis size, the residual subchannel-axis size, and a number of null padding slots after every burst allocation.

4. The method of claim 1, further comprising:
estimating a MAP message size;
selecting a burst having a highest priority among the bursts to be allocated to the first region;
comparing a total number of slots to be allocated to the first region with a maximum number of slots allocatable to the first region and recognized by estimating the MAP message size;
if the total number of slots to be allocated to the first region is less than or equal to the maximum number of slots, allocating the selected burst; and
if the total number of slots to be allocated to the first region is greater than the maximum number of slots, allocating the selected burst after fragmenting the selected burst.

5. The method of claim 4, further comprising:
if the selected burst cannot be fragmented, excluding a Protocol Data Unit (PDU) having a lowest priority from a list of allocatable bursts among a plurality of Protocol Data Units constituting bursts of the first region; and
adding a Protocol Data Unit having a priority subsequent to that of the excluded Protocol Data Unit to the list of allocatable bursts.

6. The method of claim 4, further comprising:
after allocating the selected burst, comparing a maximum number of available null padding slots with a number of null padding slots actually accumulated by burst allocation; and
if the number of null padding slots actually accumulated is less than or equal to the maximum number of available null padding slots, selecting and allocating a burst having a highest priority from among the bursts to be allocated to the first region.

7. The method of claim 6, further comprising:
if the number of null padding slots actually accumulated is greater than the maximum number of available null padding slots, comparing a sum of subchannel-axis sizes of the first region with a maximum number of subchannels per symbol; and
if the maximum number of subchannels per symbol is greater than the sum of subchannel-axis sizes, excluding a Protocol Data Unit having the lowest priority from the list of allocatable bursts among the plurality of Protocol Data Units constituting the bursts of the first region.

8. The method of claim 7, further comprising:
if the maximum number of subchannels per symbol is greater than or equal to the sum of subchannel-axis sizes, incrementing by one a minimum subchannel-axis size required to allocate the first region; and
after cancelling the entire burst allocation of the first region, re-performing burst allocation on the bursts of the first region.

9. The method of claim 1, further comprising:
before each operation of burst allocation, determining whether there is a residual resource in the first region and also determining whether there is a burst to be allocated among the bursts of the first region; and if there is no residual resource in the first region or if there is no burst to be allocated among the bursts of the first region, one-dimensionally allocating bursts of at least one region conforming to the one-dimensional allocation.

10. The method of claim 1, wherein each of the MIMO zone and the nonMIMO zone is divided along the frequency axis into a Hybrid Automatic Repeat reQuest (HARQ) region for transmitting a burst conforming to an HARQ scheme and a nonHARQ region for transmitting a burst not conforming to the HARQ scheme.

11. The method of claim 10,
wherein the HARQ region conforms to the one-dimensional allocation, and
wherein the nonHARQ region conforms to the two-dimensional allocation.

12. The method of claim 1, further comprising, after completing burst allocation in the first region, allocating bursts of a second region conforming to the two-dimensional allocation.

13. The method of claim 12, wherein the plurality of regions are divided along the time axis into a MIMO zone for transmitting a burst conforming to a MIMO scheme and a nonMIMO zone for transmitting a burst conforming to a SISO scheme or a SIMO scheme.

14. The method of claim 13, wherein each of the MIMO zone and the non-MIMO zone is divided along the frequency axis into an HARQ region for transmitting a burst conforming to an HARQ scheme, a boosting region for transmitting a burst not conforming to the HARQ scheme and applied with power boosting, a deboosting region for transmitting a burst not conforming to the HARQ scheme and applied with power deboosting, and a normal region for transmitting a burst not conforming to the HARQ scheme and not applied with power deboosting or power boosting.

15. The method of claim 14,
wherein the HARQ region conforms to the one-dimensional allocation, and
wherein the boosting region, the deboosting region, and the normal region conform to the two-dimensional allocation.

16. A base station (BS) apparatus in a wireless communication system, the apparatus comprising:
a manager configured to:
divide a downlink period into a plurality of regions according to a burst property; and
calculate a residual symbol axis size and a residual subchannel axis size of a first region conforming to a two-dimensional allocation from among the plurality of regions; and
an allocator configured to:
allocate bursts to the first region in a descending order of burst size, the bursts being respectively allocated in at least one of a rectangular shape having a length corresponding to the number of residual symbols along a time axis and in a rectangular shape having a length corresponding to the number of residual subchannels along a frequency axis; and
allocate bursts to at least one of the regions conforming to a one-dimensional allocation from among the plurality of regions according to a scheduling priority,
wherein the plurality of regions are divided along the time axis into a Multiple Input Multiple Output (MIMO) zone for transmitting a burst conforming to a MIMO scheme and a nonMIMO zone for transmitting a burst conforming to a Single Input Single Output (SISO) scheme or a Single Input Multiple Output (SIMO) scheme.

17. The apparatus of claim 16, wherein the allocator is configured to allocate the bursts such that a number of generated null padding slots is minimized.

18. The apparatus of claim 16, wherein the manager is configured to update the residual symbol axis size, the residual subchannel-axis size, and a number of null padding slots after every burst allocation.

19. The apparatus of claim 16,
wherein the manager is configured to estimate a MAP message size, and
wherein the allocator is configured to select a burst having a highest priority from among the bursts to be allocated to the first region, to compare a total number of slots to be allocated to the first region with a maximum number of slots allocatable to the first region and recognized by estimating the MAP message size, and to allocates the selected burst if the total number of slots to be allocated to the first region is less than or equal to the maximum number of slots, whereas the allocator is configured to allocate the selected burst after fragmenting the selected burst if the total number of slots to be allocated to the first region is greater than the maximum number of slots.

20. The apparatus of claim 19, wherein the allocator is configured, if the selected burst cannot be fragmented, to exclude a Protocol Data Unit (PDU) having a lowest priority from a list of allocatable bursts among a plurality of Protocol Data Units constituting bursts of the first region, and to add a Protocol Data Unit having a priority subsequent to that of the excluded Protocol Data Unit to the list of allocatable bursts of the allocatable bursts.

21. The apparatus of claim 19, wherein the allocator is configured, after allocating the selected burst, to compare a maximum number of available null padding slots with a number of null padding slots actually accumulated by burst allocation, and if the number of null padding slots actually accumulated is less than or equal to the maximum number of available null padding slots, to select and allocate a burst having a highest priority among the bursts to be allocated to the first region.

22. The apparatus of claim 21, wherein the allocator is configured, if the number of null padding slots actually accumulated is greater than the maximum number of available null padding slots, to compare a sum of subchannel-axis sizes of the first region with a maximum number of subchannels per symbol, and if the maximum number of subchannels per symbol is greater than the sum of subchannel-axis sizes, to exclude the a Protocol Data Unit having the lowest priority from the list of allocatable bursts among the plurality of Protocol Data Units constituting the bursts of the first region.

23. The apparatus of claim 22, wherein the allocator is configured, if the maximum number of subchannels per symbol is greater than or equal to the sum of subchannel-axis sizes, to increment by one a minimum subchannel-axis size required to allocate the first region, and to re-perform burst allocation on the bursts of the first region after cancelling the entire burst allocation of the first region.

24. The apparatus of claim 16, wherein the allocator is configured, before each operation of burst allocation, determine whether there is a residual resource in the first region and also to determine whether there is a burst to be allocated among the bursts of the first region, and if there is no residual resource in the first region or if there is no burst to be allocated among the bursts of the first region, to one-dimensionally allocate bursts of at least one region conforming to the one-dimensional allocation.

25. The apparatus of claim 16, wherein the allocator is configured to divide each of the MIMO zone and the non- MIMO zone along the frequency axis into a Hybrid Automatic Repeat reQuest (HARQ) region for transmitting a burst conforming to an HARQ scheme and a nonHARQ region for transmitting a burst not conforming to the HARQ scheme.

26. The apparatus of claim 25,
wherein the HARQ region conforms to the one-dimensional allocation, and
wherein the nonHARQ region conforms to the two-dimensional allocation.

27. The apparatus of claim 16, wherein the allocator is configured, after completing burst allocation in the first region, to allocate bursts of a second region conforming to the two-dimensional allocation.

28. The apparatus of claim 27, wherein the allocator is configured to divide the plurality of regions along the time axis into a MIMO zone for transmitting a burst conforming to a MIMO scheme and a nonMIMO zone for transmitting a burst conforming to a SISO scheme or a SIMO scheme.

29. The apparatus of claim 28, wherein the allocator is configured to divide each of the MIMO zone and the non-MIMO zone along the frequency axis into an HARQ region for transmitting a burst conforming to an HARQ scheme, a boosting region for transmitting a burst not conforming to the HARQ scheme and applied with power boosting, a deboosting region for transmitting a burst not conforming to the HARQ scheme and applied with power deboosting, and a normal region for transmitting a burst not conforming to the HARQ scheme and not applied with power deboosting and power boosting.

30. The apparatus of claim 29,
wherein the HARQ region conforms to the one-dimensional allocation, and
wherein the boosting region, the deboosting region, and the normal region conform to the two-dimensional allocation.

* * * * *